US005679930A

United States Patent [19]

Katsurahira

[11] Patent Number: 5,679,930
[45] Date of Patent: Oct. 21, 1997

[54] POSITION POINTING DEVICE INCLUDING A CONTROLLER FOR AN AC FIELD EMITTER IN ACCORDANCE WITH A BINARY CODE

[75] Inventor: Yuji Katsurahira, Saitamaken, Japan

[73] Assignee: Wacom Co., Ltd., Saitama-ken, Japan

[21] Appl. No.: 318,171

[22] Filed: Oct. 5, 1994

[30] Foreign Application Priority Data

Oct. 29, 1993 [JP] Japan .................................. 5-271444
Dec. 14, 1993 [JP] Japan .................................. 5-313439

[51] Int. Cl.$^6$ ............... G08C 21/00; G08C 19/00; G08C 19/06; G09G 3/02
[52] U.S. Cl. ............... 178/19; 178/18; 345/179; 340/825.54; 340/870.3; 340/870.31
[58] Field of Search ................. 178/18, 19, 20; 345/179, 180-184; 340/825.54, 820.3, 820.31; 364/709.1, 709.11, 709.13

[56] References Cited

U.S. PATENT DOCUMENTS

| 3,571,510 | 3/1971 | Weir | 178/18 |
|---|---|---|---|
| 4,260,852 | 4/1981 | Fencl | 128/19 |
| 4,710,760 | 12/1987 | Kasday | 345/179 |
| 5,313,024 | 5/1994 | Morita | 178/20 |
| 5,349,139 | 9/1994 | Verrier et al. | 178/19 |

FOREIGN PATENT DOCUMENTS

| 63-70326 | 3/1988 | Japan . |
|---|---|---|
| 64-53223 | 3/1989 | Japan . |
| 3-189716 | 8/1991 | Japan . |

Primary Examiner—Curtis Kuntz
Assistant Examiner—Vijay Shankar
Attorney, Agent, or Firm—Lowe, Price, LeBlanc & Becker

[57] ABSTRACT

A position pointing device codes information corresponding to an operation expressed by a continuously variable parameter without using an A/D converter and transmits the coded information to a position detecting device. The information corresponding to the operation expressed by the continuously variable parameter is converted into a time length. A counter counts the number of waves of an AC field received by a receiving circuit within the time length determined by the converting circuit, and performs binary coding of the counted value. A control circuit controls an emitter circuit in accordance with the binary code to change an AC field which is sent back to the position detecting device.

17 Claims, 17 Drawing Sheets 5,679,930

1

POSITION POINTING DEVICE INCLUDING A CONTROLLER FOR AN AC FIELD EMITTER IN ACCORDANCE WITH A BINARY CODE

BACKGROUND OF THE INVENTION

1. Field of the Invention

The present invention relates to an improvement in a position pointing device which is electromagnetically or electrostatically coupled with a position detecting device so as to be able to point a position on the position detecting device.

2. Description of the Related Arts

Prior to the instant application, the applicant has proposed, in Japanese Patent Application No. 61-213970 (Japanese Patent Laid-Open No. 63-70326), a position detecting device in which a sensing section exchanges electric wave signal with a position pointing device so as to detect a position pointed by the position pointing device.

Briefly, the position detecting device disclosed in Japanese Patent Laid-Open No. 63-70326 has a plurality of loop coils constituting the sensing section and adapted to transmit an electric wave of a predetermined frequency. The electric wave is received by resonance circuit provided in the position pointing device so that resonance takes place in the resonance circuit to emit electric wave. This electric wave is received by the loop coil so that a voltage is inducted in the loop coil. This operation is conducted successively over the plurality of loop coils constituting the sensing section, so that the coordinate values of the position pointed by the position pointing device is detected based on the levels of the voltages induced in the loop coils.

The position detecting device of the type described faces a demand for abilty to enter various kinds of additional information in addition to the coordinate values of the pointed position, such as information which indicates that the pointing means, e.g., a pen or the like, has been set to a position for pointing a definite position (this state will be referred to as "pen-down state", hereinafter), information concerning the type of the printing means, e.g., a pen, a cursor or the like, as well as a demand for inputting, together with the coordinate values, information for continuously varying values of parameters other than the coordinate information, such as, for example, thickness or width of a line and hue or density (brightness) of the position or area appointed by the pointing device.

To cope with such demands, the position pointing device disclosed in Japanese patent Laid-Open No. 63-70326 employs a manual switch which selectively connects, to the resonance circuit which is constituted by a coil and a capacitor, an additional capacitor so as to slightly vary the resonance frequency, the slight variation in the resonance frequency being detected as a variation in the phase angle so as to be used as information indicative of the pen-down state or the type of the pointing means.

In Japanese Patent Application No. 62-208293 (Japanese Patent Laid-Open No. 64-53223), the applicant also proposed a position pointing device having a resonance circuit including a coil the inductance of which continuously varies according to the pen pressure, so that the resonance frequency continuously varies according to the pen pressure, the linear change in the resonance frequency being detected as a continuous change in the phase angle so as to be used as information for linearly varying the parameter.

2

Thus, in these known position pointing devices, information is obtained in the form of a change in the phase angle. This type of device essentially requires that the range over which the resonance frequency of the resonance circuit varies as a result of operation of a manual switch or change in the pen pressure precisely coincides with a certain range which is centered at the frequency of the electric wave transmitted from the sensing section. A laborious adjusting work is required to attain such a matching of the frequency range. In addition, the detectable range of phase angle is limited to be from about −60° to about +60°. Furthermore, a certain tolerance for the phase angle to be detected has to be set in order to accommodate any change in the inductance of the coil and capacitance of the capacitor of the resonance circuit caused by a change in the ambient temperature. For these reasons, the number of kinds of information which can be entered is undesirably limited.

Under this circumstance, the same applicant proposed, in Japanese Patent Application No. 1-327276 (Japanese Patent Laid-Open No. 3-189716), a combination of a position detecting device and a position pointing device. In this art, the position pointing device incorporates a resonance circuit which includes a power supply circuit capable of extracting electric energy from a voltage induced, and a code generator activated by the extracted electric energy and capable of generating binary code of a plurality of bits in accordance with an operation of a switch. In operation, an additional capacitor or capacitors are connected to or disconnected from the coil and the capacitor of the resonance circuit by functioning of an electronic switch in accordance with the binary code, so that the resonance frequency is slightly varied in accordance with the binary code. The slight variation of the resonance frequency corresponding to the binary code is detected as a change in the phase angle, and the phase angle thus detected is transformed into the binary code, whereby a plurality of kinds of information corresponding to the bit number of the binary codes are entered.

As in the case of the art disclosed in Japanese Patent Laid-Open No. 64-53223, the device shown in Japanese Patent Laid-Open No. 3-189716, for the purpose of entering information concerning operation expressed by a continuous amount, e.g., pen pressure, still relies upon a linear change in the resonance frequency presented in accordance with the change in the pen pressure. This is attributable to the following reason.

In general, coding of information concerning an operation expressed by an amount which varies continuously, i.e., in a non-discrete manner, essentially requires an analog-to-digital (A/D) converting circuit. A/D converter circuits which are now commercially available consume large electric power and, hence, cannot suitably be used in a device such as that disclosed in Japanese Patent Laid-Open No. 189716 in which circuits are driven with small electric energy derived from an electric wave transmitted from the sensing section. It would be possible to overcome this problem by using batteries as auxiliary power supply but such a solution is impractical since the batteries will be exhausted shortly to require frequent renewal or recharging. This is the reason why the continuous change in the resonance frequency is employed as the sign of change in the parameter such as the pen pressure.

SUMMARY OF THE INVENTION

Accordingly, an object of the present invention is to provide a position pointing device in which information concerning an operation expressed by a continously variable parameter amount is coded without aid of A/D converting circuit and then transmitted to a position detecting device.

Another object of the present invention is to provide a position pointing device in which information concerning operation expressed by a continously variable parameter is coded and transmitted to a position detecting device, wherein requirement for auxiliary power supply such as batteries is completely eliminated or, when such auxiliary power supply is used, requirement for frequent renewal or recharging of batteries is reduced.

Still another object of the present invention is to provide a position pointing device in which a plurality of kinds of information concerning operations expressed by continously variable parameters are coded without aid of A/D converting circuit and then transmitted to a position detecting device.

A further object of the present invention is to provide a position pointing device in which a plurality of kinds of information concerning operations expressed by continously variable parameters are coded and transmitted to a position detecting device, wherein requirement for auxiliary power supply such as batteries is completely eliminated or, when such an auxiliary power supply is used, requirement for frequent renewal or recharging of batteries is reduced.

To these ends, according to one aspect of the present invention, there is provided a position pointing device, comprising: receiving means for receiving alternating electric, magnetic or electromagnetic field of a predetermined frequency radiated from a position detecting device; responding means for sending alternating electric, magnetic or electromagnetic field of a desired frequency back to the position detecting device; control means for controlling the responding means in accordance with a binary code indicative of information corresponding to an operation which is expressed by a continously variable parameter, so as to cause a change in the alternating electric, magnetic or electromagnetic field to be sent back to the position detecting device; converting means for converting the information corresponding to the operation into a time length; and counting means for counting the number of waves of the alternating electric, magnetic or electromagnetic field of the predetermined frequency received within the time length determined by the converting means and for binary-coding the counted value.

The above and other objects, features and advantages of the present invention will become clear from the following description when the same is read in conjunction with the accompanying drawings.

DESCRIPTION OF THE PREFERRED EMBODIMENTS

Before turning to the description of preferred embodiments, a description will be given of various basic forms of the present invention.

Figure 1:
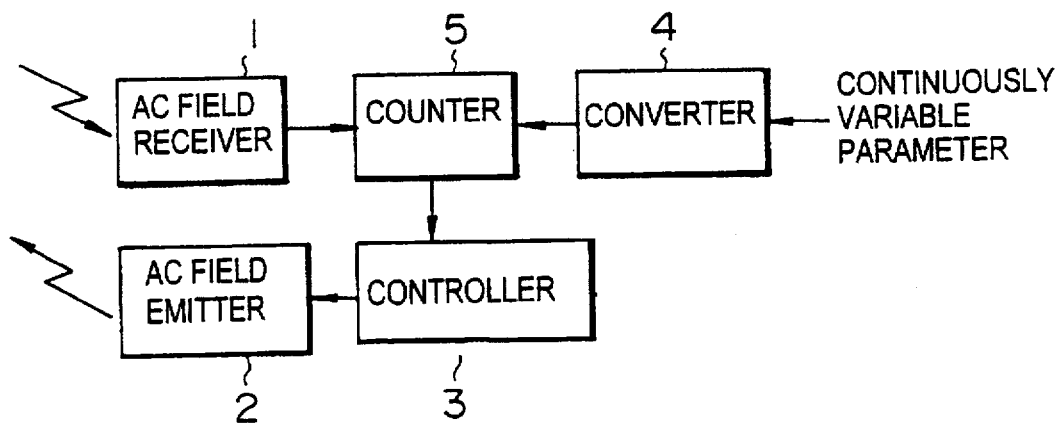
FIG. 1 is a block diagram illustrative of a basic form of the position pointing device in accordance with the present invention.

FIG. 1 is a block diagram showing a basic form of the position pointing device of the present invention. The position pointing device in accordance with this basic form of the invention has a receiving means 1 for receiving an alternating electric field, an alternating magnetic field or an alternating electromagnetic field, i.e., an AC field, of a predetermined frequency radiated from a position detecting device which is not shown. The device also has a responding means 2, i.e., an AC field emitter, which sends an alternating electric field, an alternating magnetic field or an alternating electromagnetic field of any desired frequency back to the position detecting device. The device also has a control means which controls the responding means 2 in accordance with a binary code indicative of information corresponding to an operation, so as to change the alternating electric field, alternating magnetic field or the alternating electromagnetic field sent back to the position detecting device. The position pointing device further has a converting means 4 for converting information corresponding to operation expressed by a continously variable parameter into time length, and counting means 5 for counting the number of waves of the alternating electric, magnetic or electromagnetic field received within the time output from the converting means 4 and for converting the number of the waves into a binary code.

In the present invention, in order to detect the information corresponding to an operation expressed by a continously variable parameter, the converting means 4 preferably is formed of an element whose characteristics linearly or continuously vary in accordance with a change in the signal input thereto. More preferably, the converting means 4 includes a time constant circuit having a passive element, i.e., an element which linearly or continuously varies its characteristic such as resistance, inductance or capacitance.

Preferably, the receiving means 1 and the responding means 2 make use of a resonance circuit, in order to achieve high efficiency of receipt of the alternating electric, magnetic or electromagnetic field from the position detecting device, as well as high efficiency of sending of the alternating electric, magnetic or electromagnetic field back to the position detecting device. When such a resonance circuit is used, the arrangement is preferably such that the resonance characteristics of the resonance circuit is variable by the control means 3 so as to cause a change in the alternating electric, magnetic or electromagnetic field sent back to the position detecting device. It is also preferred that a power extracting means are provided for extracting, from the alternating electric, magnetic or electromagnetic wave received by the resonance circuit, electrical power used for driving various circuits in the position pointing device.

It is also preferred that the responding means 2 is operated in synchronization with the operation of the position detecting device so that the information corresponding to an operation expressed by a continously variable parameter is efficiently transmitted to the position detecting device.

Figure 2:
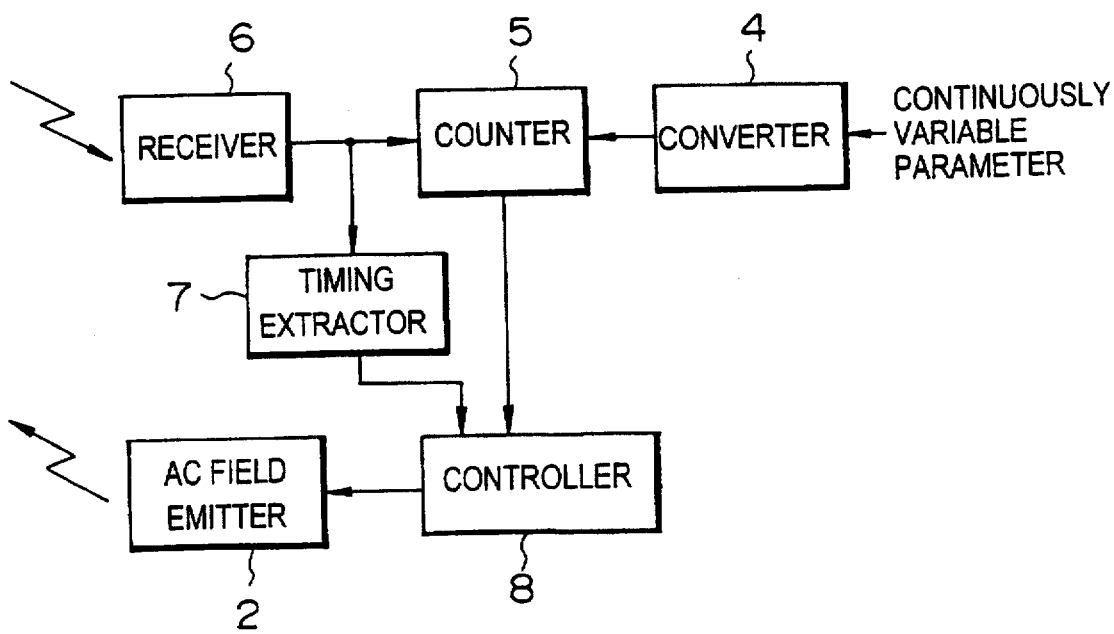
FIG. 2 is a block diagram illustrative of another basic form of the position pointing device in accordance with the present invention.

FIG. 2 shows another basic form of the position pointing device of the present invention which can cope with the aforesaid demands. In this Figure, the reference numerals which are the same as those appearing in FIG. 1 denote the same parts or components as those of the basic form of the invention shown in FIG. 1. Thus, numeral 2 denotes responding means, 4 denotes converting means, and 5 denotes counting means. Numeral 6 designates receiving means which receives alternating electric, magnetic or electromagnetic field of a predetermined frequency radiated at predetermined timings from the position detecting device, 7 denotes timing extracting means which extracts the above-mentioned predetermined timings from the alternating electric, magnetic or electromagnetic field, and 8 denotes control means which controls, at a preselected timing determined based on the above-mentioned predetermined timings, the responding means 2 in accordance with a binary code representative of information corresponding to the operation, thereby causing a change in the alternating electric, magnetic or electromagnetic field which is to be sent back to the position detecting device.

In the present invention, in order to realize a time sharing between the receiving of the alternating electric, magnetic or electromagnetic field radiated from the position detecting device and the sending of the alternating electric, magnetic or electromagnetic field back to the position detecting device, the radiation of the alternating electric, magnetic or electromagnetic field from the position detecting device is conducted intermittently at a predetermined period such that a predetermined duration of radiation is followed by a predetermined period of suspension, and the responding means 2 is controlled in synchronization with the suspension of the radiation of the alternating electric, magnetic or electromagnetic field from the position detecting device.

Furthermore, in the present invention, it is also preferred that a time sharing can be realized between the detection of the coordinate values of the pointed position in the position detecting device and the transmission of information corresponding to operation expressed by the continously variable parameter. To this end, the radiation of the alternating electric, magnetic or electromagnetic field at a predetermined frequency from the position detecting device is preferably conducted continuously for a predetermined period or longer, followed by an intermittent radiation conducted at a repetition period sufficiently shorter than the predetermined period of the continuous radiation and with a predetermined duration. In this case, the responding means 2 is controlled in synchronization with the suspension or termination of the radiation during the intermittent radiation which is conducted after the continuous radiation performed for the predetermined period or longer time.

In the present invention, it is also preferred that a plurality of kinds of information corresponding to a plurality of types of operation expressed by continously variable parameters are transmitted to the position detecting device.

Figure 3:
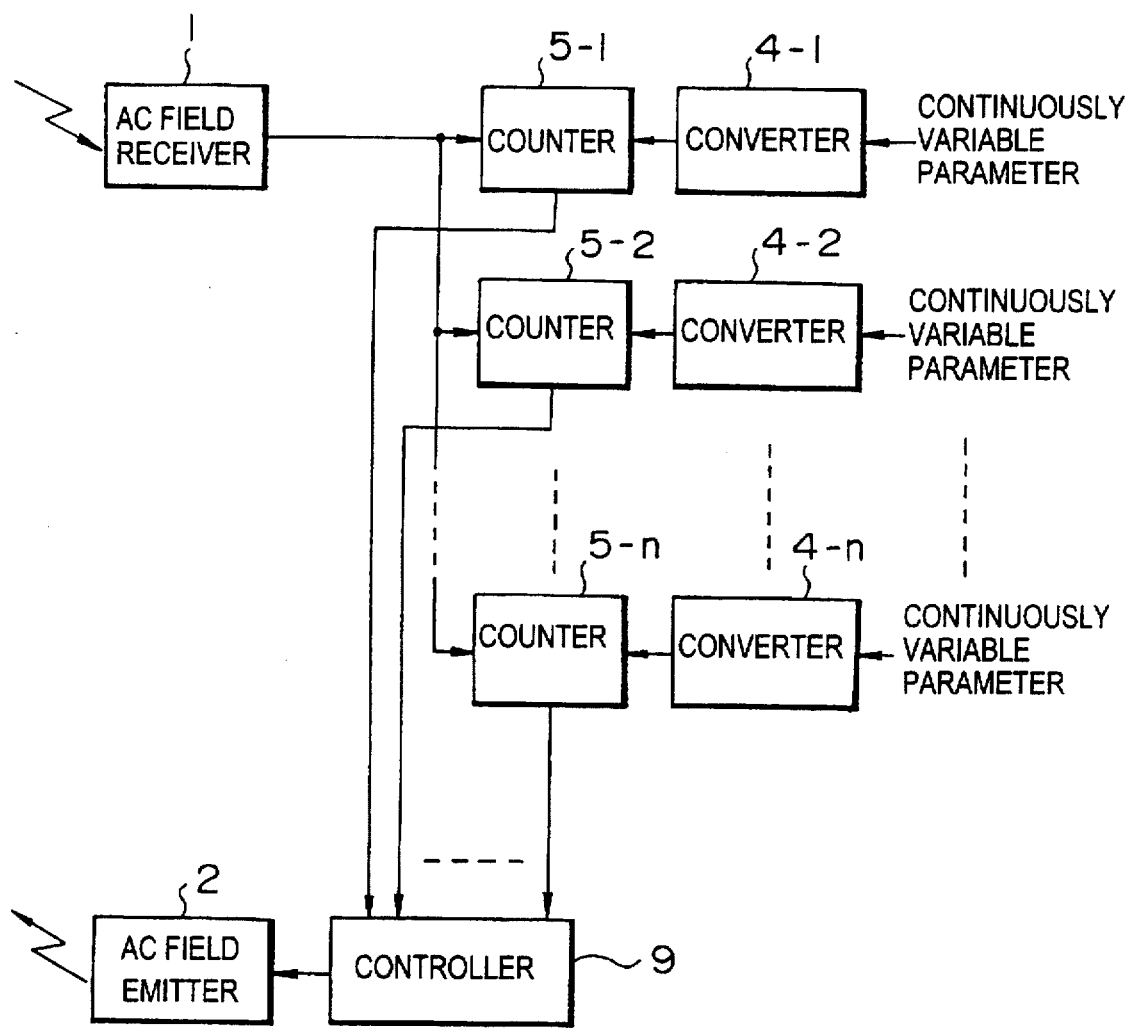
FIG. 3 is a block diagram illustrative of still another basic form of the position pointing device in accordance with the present invention.

FIG. 3 shows still another basic form of the position pointing device in accordance with the present invention which copes with the above-described demand. In this Figure, the same reference numerals as those appearing in FIG. 1 denote the same parts or components as those used in the basic form of the invention shown in FIG. 1. Thus, numeral 1 denotes a receiving means, while 2 denotes a responding means. Numerals 4-1, 4-2, . . . , 4-n denote converting means which respectively convert a plurality of kinds of information corresponding to a plurality of types of operation expressed by continously variable parameters into lengths of time, while numerals 5-1, 5-2, . . . , 5-n denote counting means which count the waves of the received alternating electric, magnetic or electromagnetic field of a predetermined frequency within the respective time lengths obtained through conversion by the converting means 4-1 to 4-n and which perform binary coding of the respective counted values. Numeral 9 denotes control means which controls the responding means 2 in accordance with the plurality of binary codes determined by the counting means 5-1 to 5-n so as to effect a change in the alternating electric, magnetic or electromagnetic field to be sent back to the position detecting device.

Preferably, the responding means 2 is controlled in synchronization with the operation of the position detecting apparatus also when the plurality of kinds of information corresponding to the plurality of types of operation expressed by continously variable parameters are sent back to the position detecting device.

Figure 4:
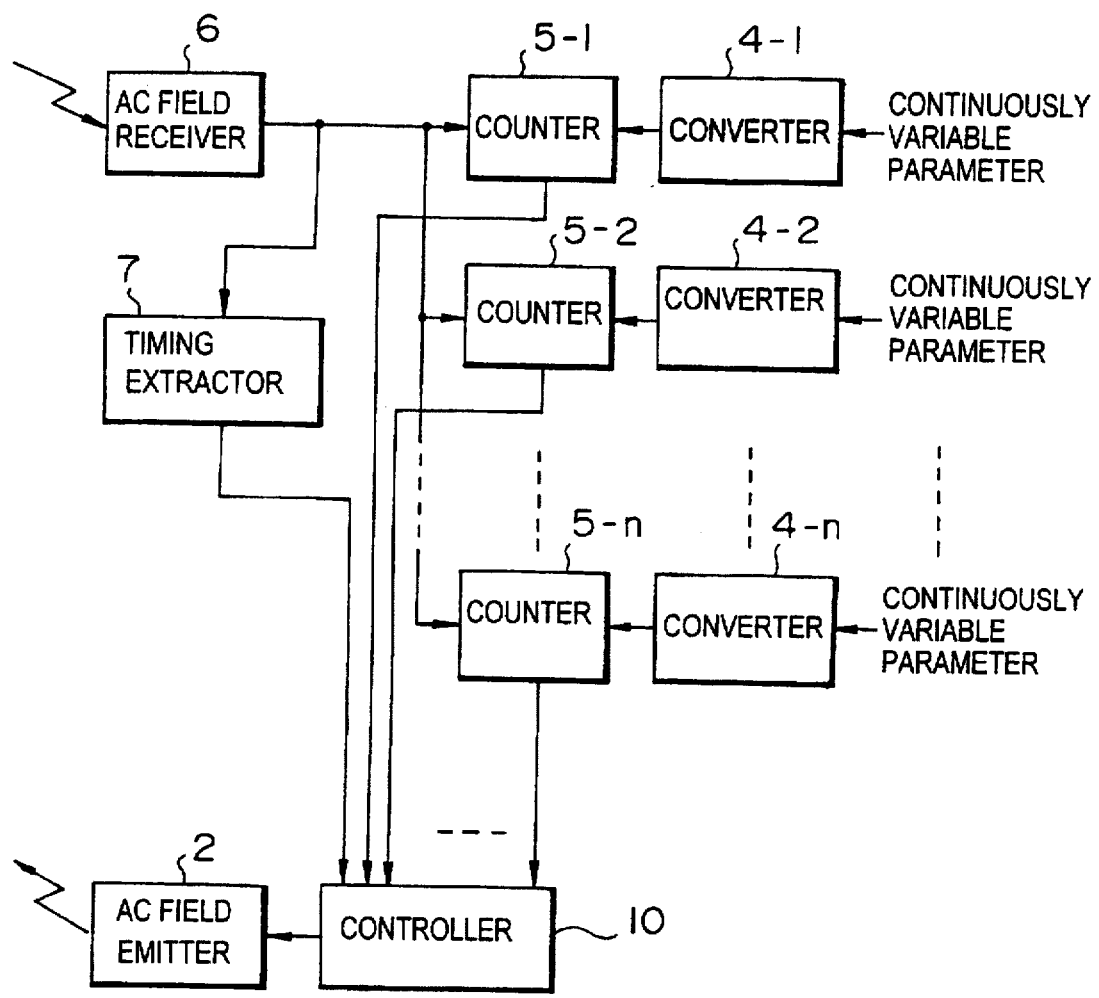
FIG. 4 is a block diagram illustrative of a further basic form of the position pointing device in accordance with the present invention.

FIG. 4 illustrates a further basic form of the position pointing device of the invention capable of coping with the above-mentioned demands. In this Figure, reference numerals which are the same as those appearing in FIGS. 1 to 3 denote the same parts or components s those used in the basic forms of the invention described before. Thus, numeral 2 denotes responding means, 4-1 to 4-n denote converting means, 5-1 t 5-n denote counting means, 6 denotes receiving means, and 7 denotes timing extracting means. Numeral 10 designates control means which controls the responding means 2 in accordance with the plurality of binary codes determined by the counting means 5-1 to 5-n so a to change the alternating electric, magnetic or electromagnetic field to be sent back to the position detecting device.

In general, counting means consumes large electric power. Therefore, the number of the counting means for determining the binary codes indicative of the plurality of kinds of information corresponding to a plurality of types of operation expressed by continously variable parameter is preferably small.

Figure 5:
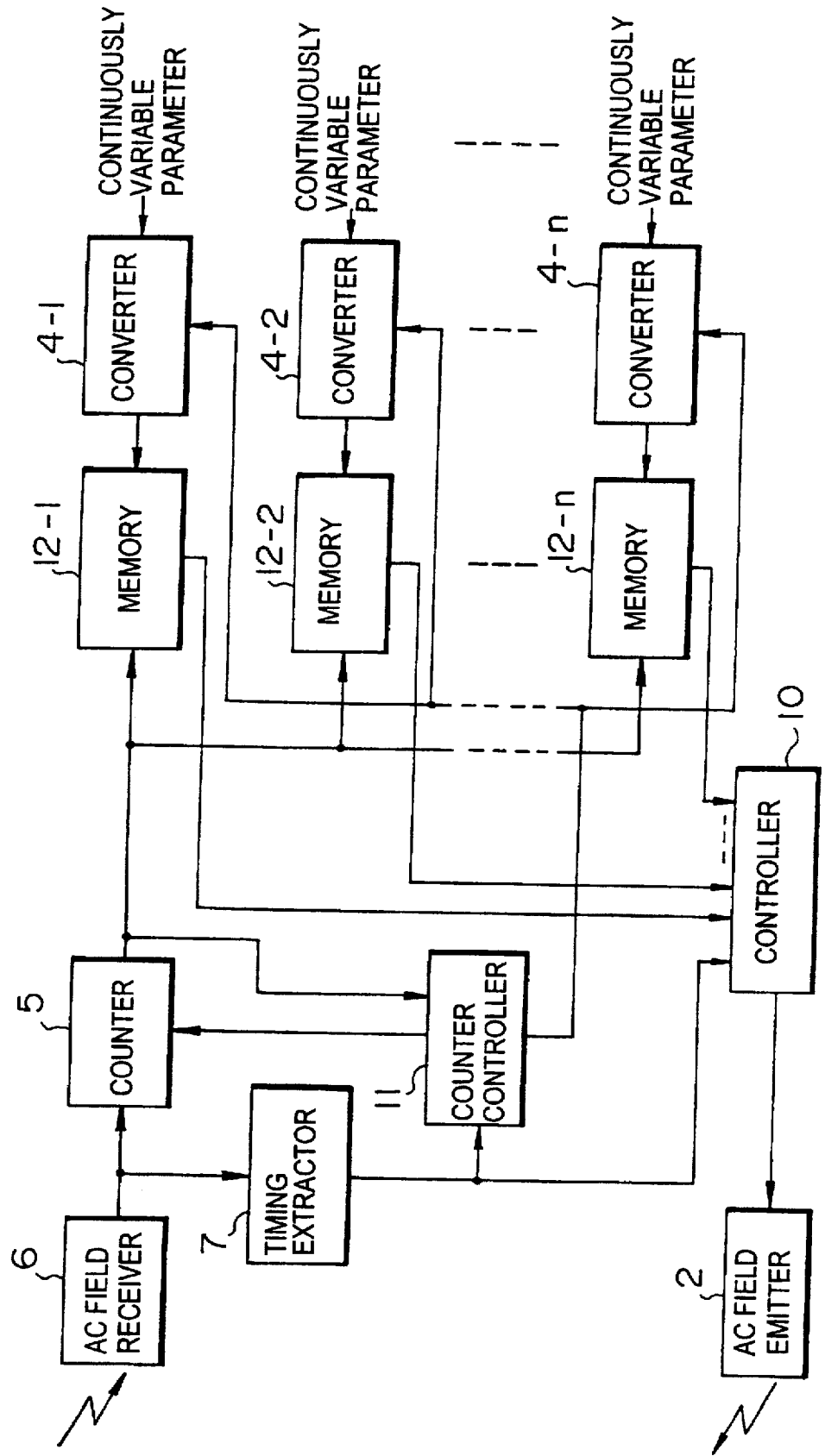
FIG. 5 is a block diagram illustrative of a still further basic form of the position pointing device in accordance with the present invention.

FIG. 5 shows a still further basic form of the position pointing device in accordance with the present invention which cope with the above-described demand.

In this Figure, the reference numerals which are the same as those appearing in FIGS. 1 to 4 denote the same parts r components as those in the basic forms described in connection with FIGS. 1 to 4. Thus, the basic form of the position pointing device shown in FIG. 5 includes responding means 2, converting means 4-1 to 4-n, counting means 5, receiving means 6, timing extracting means 7 and control means 10. Numeral 11 designates counting control means which initiates the operations of the converting means 4 at a preselected timing based on a predetermined timing and initiates also the operation of the counting means 5 at the above-mentioned preselected timing or at another timing synchronous with the preselected timing. Numerals 12-1, 12-2, . . . , 12-n denote information holding means which hold the values counted by the counting means 5 at the moments of termination of the respective time lengths determined by the respective converting means 4-1 to 4-n.

In order to shorten the time of operation of the counting means 5, it is preferred that the operation of the counting means 5 is ceased at the time when the value counted by the counting means 5 has reached a preset maximum value to be measured.

The converting means 4 also consumes large power. It is therefore preferred that the timings of operations of the plurality of converting means are suitably deviated when the plurality of kinds of information corresponding to a plurality of operations expressed by continously variable parameter are converted into respective time lengths.

Figure 6:
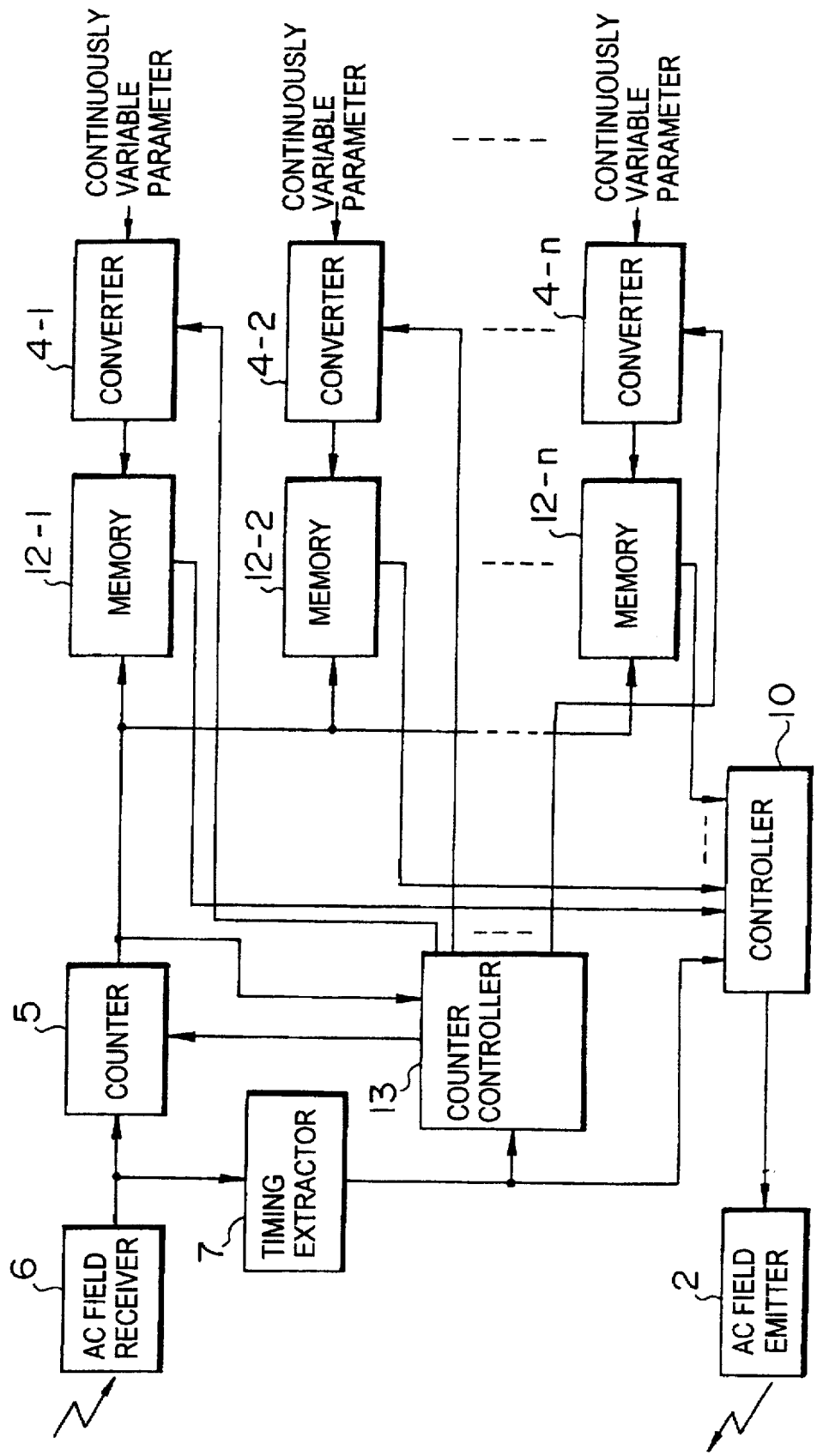
FIG. 6 is a block diagram illustrative of a yet further basic form of the position pointing device in accordance with the present invention.

FIG. 6 shows a yet further basic form of the position pointing device of the present invention capable of coping with the above-described demand. In this Figure, the reference numerals which are the same as those appearing in FIGS. 1 to 5 denote the same parts or members as those used in the basic forms described in connection with FIGS. 1 to 5.

Thus, the basic form of the position pointing device shown in FIG. 6 has responding means 2, converting means 4-1 to 4-n, counting means 5, receiving means 6, timing extracting means 7, control mans 10 and information holding means 12-1 to 12-n. Numeral 13 denotes counting control means which initiates the operations of the plurality of converting means 4-1 to 4-n one after another at a series of timings, beginning with a preselected timing determined based on a predetermined timing and followed by successive timings determined at a predetermined time interval starting from the preselected timing. The counting control means 13 also serves to repeatedly initiate the operation of the counting means 5 at a series of timings beginning with the above-mentioned preselected timing and followed by successive timings with a predetermined time interval starting from the preselected timing or at other series of timings which is at a predetermined phase difference from the above-mentioned series of timings.

Figure 7:
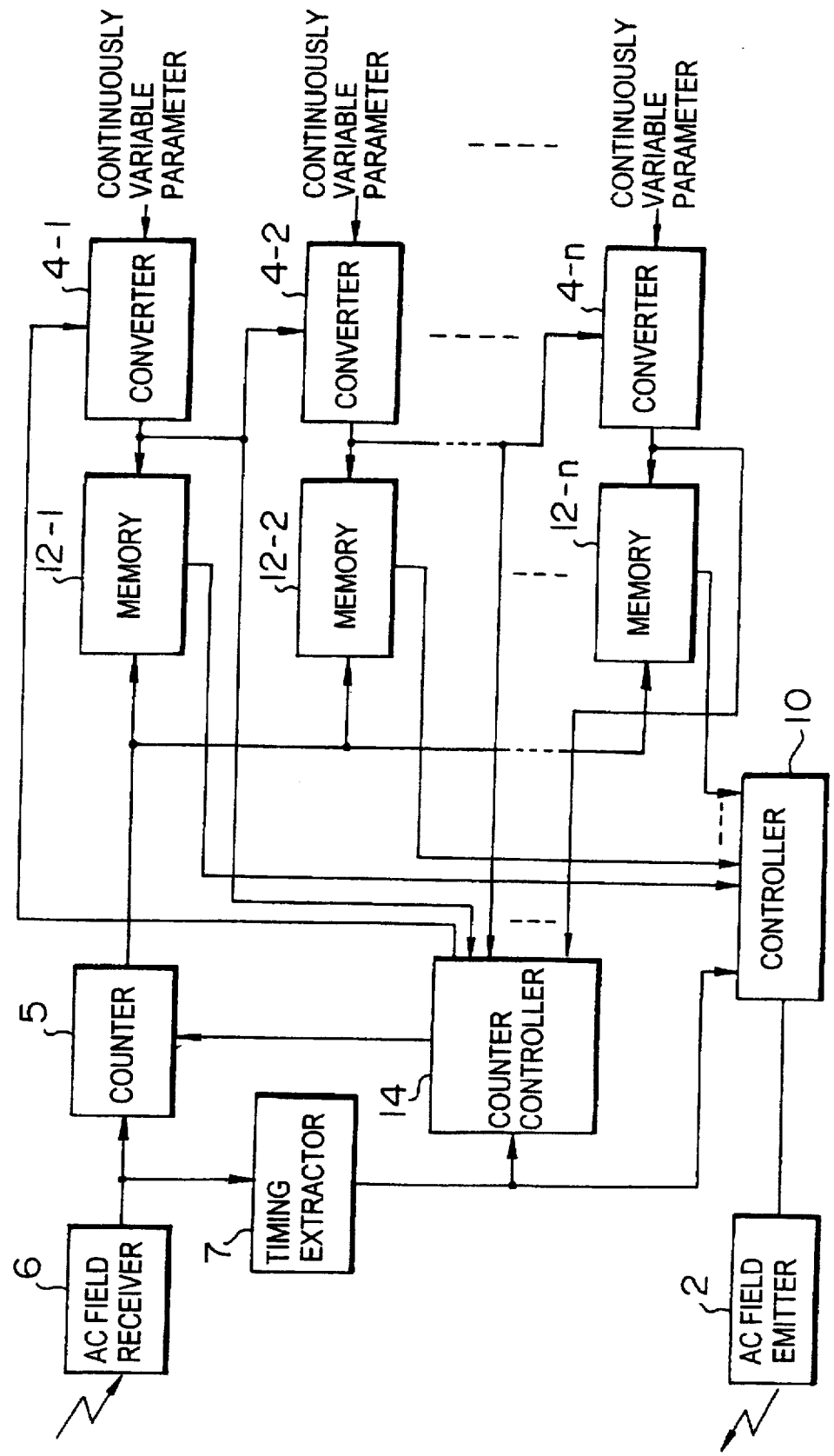
FIG. 7 is a block diagram illustrative of a yet further basic form of the position pointing device in accordance with the present invention.

FIG. 7 shows a yet further basic form of the position pointing device in accordance with the present invention, capable for coping with the aforesaid demand. In this Figure, the reference numerals which are the same as those in FIGS. 1 to 5 denote the same parts or components as those used in the basic forms described before in connection with FIGS. 1 to 5. Thus, the basic form of the position pointing device of the invention shown in FIG. 7 has responding means 2, converting mean 4-1 to 4-n, counting means 5, receiving means 6, timing extracting means 7, control means 10 and information holding means 12-1 to 12-n. Numeral 14 denotes counting control means which initiates operation of one of the plurality of converting means 4-1 to 4-n at a preselected timing determined based on a predetermined timing and initiates the operation of the next converting means at the timing a which the time determined by the first-mentioned converting means is over, thus initiating the operations of the successive converting means one after another in the described manner. The counting control means 14 also repeatedly triggers the operation of the counting means 5 at the same timings as the start of operations of the successive converting means 4-1 to 4-n or at timings which are at a predetermined phase difference from these timings.

In order to shorten the time of operation of the counting means 5, the operation of the counting means 5 is ceased at the moment at which the time determined by the last one of the converting means 4-1 to 4-n expires or at a timing which is at a predetermined time difference from the expiration.

In order to ensure stable operations of the converting means 4-1 to 4-n and the counting means 5, where the alternating electric, magnetic or electromagnetic field is continuously radiated from the position detecting device for a predetermined period or a longer time followed by intermittent radiation conducted at a repetition period sufficiently shorter than the above-mentioned period of continuous radiation and with a predetermined duration, it is preferred that the timing of the field radiation conducted for the predetermined period or longer time is preferably used as the above-mentioned preselected timing.

The operations of the above-described basic forms of the invention are as follows.

In operation of the basic form of the position input device of the invention shown in FIG. 1, the counting means 5 counts only the waves which have been received within the time which is output from the converting means 4 and which is indicative of the information corresponding to the operation expressed by continously variable parameter, from among the waves of the waves of the alternating electric, magnetic or electromagnetic field of a predetermined frequency received by the receiving means 1. It is therefore possible to conduct, within minimal time, the binary coding of the time, i.e., the information corresponding to the operation expressed by the continously variable parameter. In addition, the binary coding can be performed without requiring generation of clock signal.

The converting means 4 may be realized with a time constant circuit including an element which exhibits a linear or continuous change of its characteristic such as resistance, inductance or capacitance. In such a case, the information corresponding to operation expressed by a continously variable parameter can be converted into time by using the change in the discharge characteristic of the time constant circuit. High efficiency of receipt of the alternating electric, magnetic or electromagnetic field by the receiving means 1, as well as high efficiency of transmission of the alternating electric, magnetic or electromagnetic field back from the responding means 2, is achievable when the receiving means 1 and the responding means 2 employ a resonance circuit. By varying the resonance characteristic of the resonance circuit by the control means 3, it is possible to change the alternating electric, magnetic or electromagnetic field to b sent back to the position detecting device. When the power extracting means is incorporated in the device, the circuits in the position detecting device can be driven by electric energy extracted from the alternating electric, magnetic or electromagnetic field received by the resonance circuit.

In operation of the basic form of the invention shown in FIG. 2, the timing extracting means 7 extracts a predetermined timing from the alternating electric, magnetic or electromagnetic field received by the receiving means 6, and the control means 8 controls the responding means 2 at a preselected timing determined based on the predetermined timing. It is therefore possible to change, in synchronization with the operation of the position detecting device, the alternating electric, magnetic or electromagnetic field sent back to the position detecting device.

When the alternating electric, magnetic or electromagnetic field is intermittently radiated at a predetermined period with a predetermined duration, the responding means 2 may be controlled in synchronization with termination of the radiation of the alternating electric, magnetic or electromagnetic field, so as to make it possible to change the alternating electric, magnetic or electromagnetic field to be sent back in synchronization with the operation of the position detecting device and to provide a distinction or time sharing between the radiation of the alternating electric, magnetic or electromagnetic field from the position detecting device and the sending back of the alternating electric, magnetic or electromagnetic field from the position pointing device.

When the radiation of the alternating electric, magnetic or electromagnetic field at a predetermined frequency from the position detecting device is conducted continuously for a predetermined period or longer, followed by an intermittent radiation conducted at a period sufficiently shorter than the predetermined period and with a predetermined duration, and by controlling the responding means 2 in synchronization with the termination of the radiation during the intermittent radiation which is conducted after the continuous radiation performed for the predetermined period or longer time, it is possible to realize a time sharing between the detection of the coordinate values of the pointed position and the transmission of information corresponding to the operation expressed by the continously variable parameter.

In operation of the basic form of the position pointing device of the invention shown in FIG. 3, the plurality of converting means 4-1 to 4-n respectively convert a plurality of kinds of information corresponding to a plurality of types of operation expressed by continously variable parameter into lengths of time, while the plurality of counting means 5-1 to 5-n count the waves of the received alternating electric, magnetic or electromagnetic field of a predetermined frequency within the respective time lengths obtained through conversion by the converting means 4-1 to 4-n and then perform binary coding of the respective counted values. It is therefore possible to transmit to the position detecting device a plurality of kinds of information corresponding to a plurality of types of operation expressed by continously variable parameters.

In operation of the basic form of the position pointing device of the invention shown in FIG. 4, the timing extracting means 7 extracts a predetermined timing from the alternating electric, magnetic or electromagnetic field received by the receiving means 6, and the control means 10 controls the responding means 2 at a preselected timing determined based on the predetermined timing. It is therefore possible to change the alternating electric, magnetic or electromagnetic field sent back to the position detecting device, in synchronization with the operation of the position detecting device.

In operation of the basic form illustrated in FIG. 5, the counting control means 11 initiates the operations of the converting means 4-1 to 4-n at a preselected timing based on a predetermined timing and initiates also the operation of the counting means 5 at the above-mentioned preselected timing or at another timing which is at a predetermined phase difference from the preselected timing. In addition, the information holding means 12-1 to 12-n hold the values counted by the counting means 5 at the moments of expiration of the respective time lengths determined by the respective converting means 4-1 to 4-n. It is therefore possible to determine, with a single counting means, a plurality of binary codes representative of a plurality of kinds of information corresponding to a plurality of type of operation expressed by continously variable parameters.

By arranging such that the operation of the counting means 5 is ceased at the time when the value counted by the counting means 5 has reached a preset maximum value to be measured, it is possible to shorten the operation time of the counting means 5, while enabling setting of the maximum value of the binary code.

In operation of the basic form shown in FIG. 6, the counting control means 13 initiates the operations of the plurality of converting means 4-1 to 4-n one after another at a series of timings, beginning with a preselected timing determined based on a predetermined timing and followed by successive timings determined at a predetermined time interval starting from the preselected timing. The counting control means 13 also serves to repeatedly initiate the operation of the counting means 5 at a series of timings beginning with the above-mentioned preselected timing and followed by successive timings with a predetermined time interval starting from the preselected timing or at other series of timings which is at a predetermined phase difference from the above-mentioned series of timings.

It is therefore possible to operate the plurality of converting means 4-1 to 4-n at different timings when they convert the plurality of kinds of information corresponding to a plurality of types of operation expressed by continously variable parameters into respective time lengths.

In operation of the basic form shown in FIG. 7, the counting control means 14 initiates operation of one of the plurality of converting means 4-1 to 4-n at a preselected timing determined based on a predetermined timing and initiates the operation of the next converting means at the timing a which the time determined by the first-mentioned converting means is over, thus initiating the operations of the successive converting means one after another in the described manner. The counting control means 14 also repeatedly triggers the operation of the counting means 5 at the same timings as the start of operations of the successive converting means 4-1 to 4-n or at timings which are at a predetermined phase difference from these timings. It is therefore possible to operate the plurality of converting means 4-1 to 4-n at different timings when they convert the plurality of kinds of information corresponding to a plurality of types of operation expressed by continously variable parameters into respective time lengths, while shortening the time of operation of the counting means 5.

By arranging such that the operation of the counting means 5 is ceased at the moment at which the time determined by the last one of the converting means 4-1 to 4-n expires or at a timing which is at a predetermined time difference from the expiration, it is possible to minimize the time of operation of the counting means 5.

In the case where the alternating electric, magnetic or electromagnetic field is continuously radiated from the position detecting device for a predetermined period or a longer time followed by intermittent radiation conducted at a period sufficiently shorter than the above-mentioned period and with a predetermined duration, it is possible to stably operate the converting means 4-1 to 4-n and the counting means 5 by arranging such that the timing of the field radiation conducted for the predetermined period or longer time is used as the above-mentioned preselected timing.

Figure 8:
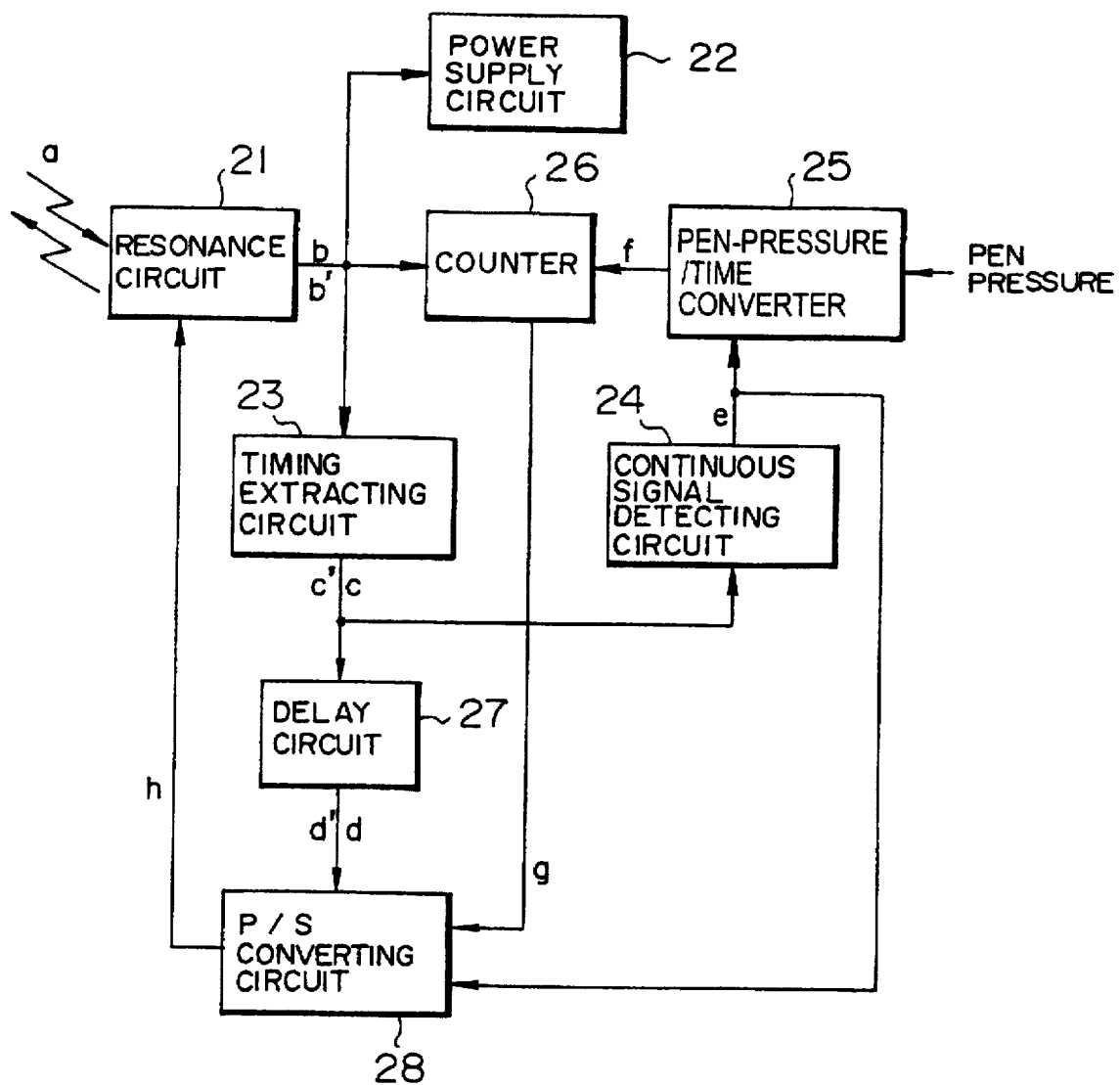
FIG. 8 is a block diagram illustrative of an embodiment of the position pointing device in accordance with the present invention.

FIG. 8 shows an embodiment of the position pointing device in accordance with the basic form of the invention shown in FIG. 2. This embodiment is used in combination with a position detecting device of the type in which electric wave of a predetermined frequency is radiated continuously for a predetermined time or longer, followed by an intermittent radiation conducted at a period which is sufficiently shorter than the period of the continuous radiation with a predetermined duration. This position pointing device has a resonance circuit 21, a power supply circuit 22, a timing extracting circuit 23, a continuous signal detecting circuit 24, a pen-pressure/time converting means 25, a counter 26, a delay circuit 27 and a parallel/serial (P/S) converting circuit 28.

The resonance circuit 21 is of a known type composed of a coil and a capacitor. The resonance characteristics, i.e., frequency and amplitude of resonance, are variable by an external control. The power supply circuit 22 also is of a known type composed of a diode and a capacitor. The power supply circuit forms a D.C. power voltage from a voltage which is induced in the resonance circuit 21 by the electric wave radiated from the position detecting device, and supplies the power voltage to other circuits in the position pointing device. The timing extracting circuit 23 extracts a predetermined timing from the voltage which is induced in the resonance circuit 21 by the electric wave radiated from the position detecting device. In this embodiment, the timing of the above-mentioned intermittent radiation of the electric wave which is conducted following the continuous radiation is detected as the above-mentioned predetermined timing.

Figure 9:
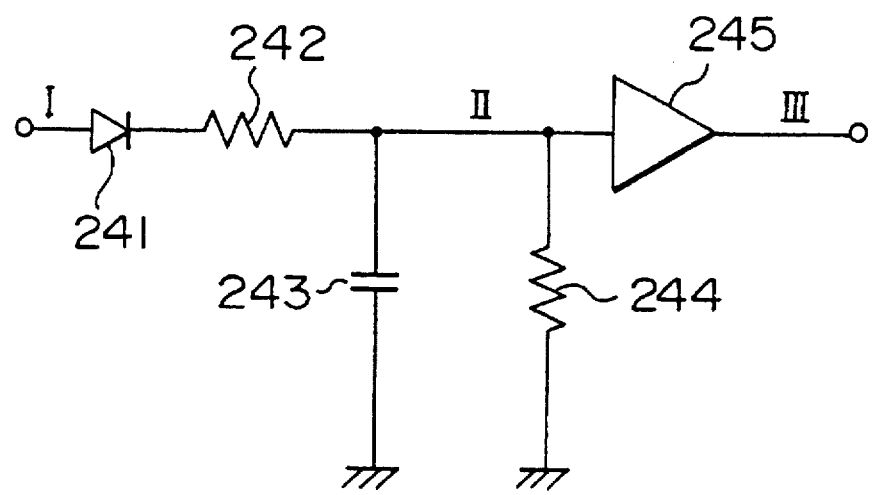
FIG. 9 is a circuit diagram illustrative of the construction of an example of a continuous signal detecting circuit incorporated in the embodiment shown in FIG. 8.
Figure 10:
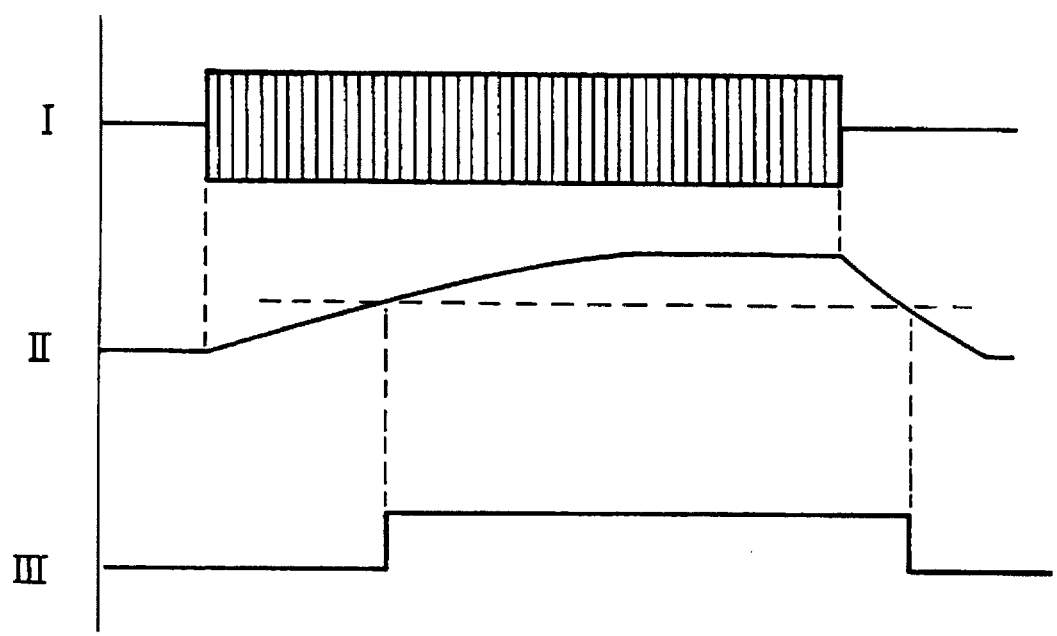
FIG. 10 is an illustration of waveforms of signals obtained at various portions of the circuit shown in FIG. 9.

FIG. 9 shows an example of the continuous signal detecting circuit 24. This circuit includes a detecting circuit having a diode 241, an integrating circuit having a resistor 242 and a capacitor, and a shaping circuit having a resistor 244 and a buffer amplifier 245. FIG. 10 shows waveforms of signals appearing in the circuit shown in FIG. 9 in response to a continuous alternating signal I which has a duration not shorter than a predetermined period. It will be seen that the alternating signal I is rectified by the diode 241 and then integrated by the resistor 242 and the capacitor 243 so as to become a signal II which is then shaped by the resistor 24 and the buffer amplifier 245 so as to become a continuous pulse signal III.

Figure 11:
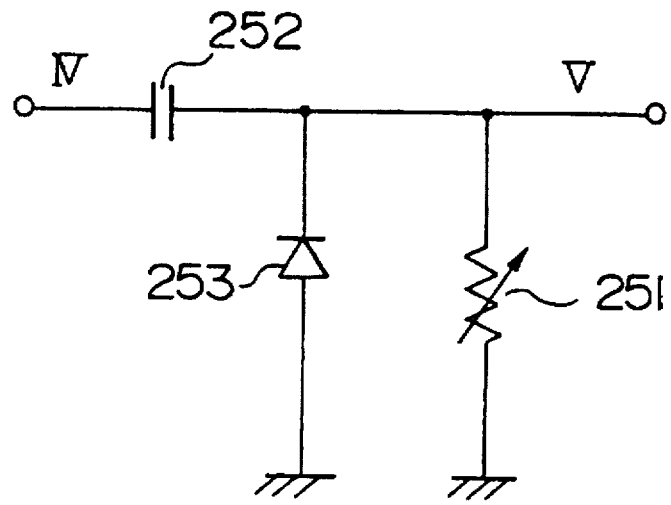
FIG. 11 is a circuit diagram illustrative of the construction of an example of a pen-pressure/time converting means incorporated in the embodiment shown in FIG. 8.
Figure 12:
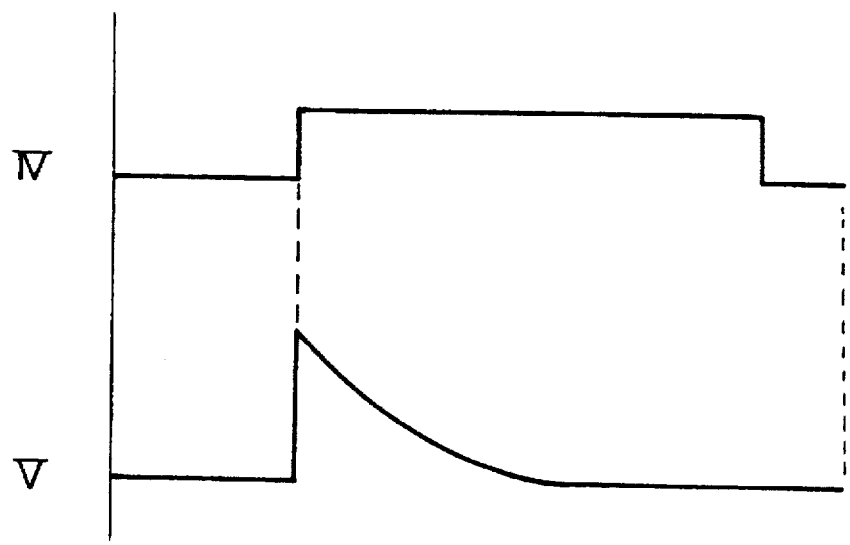
FIG. 12 is an illustration of waveforms of signals obtained at various portions of the circuit shown in FIG. 11.
Figure 18:
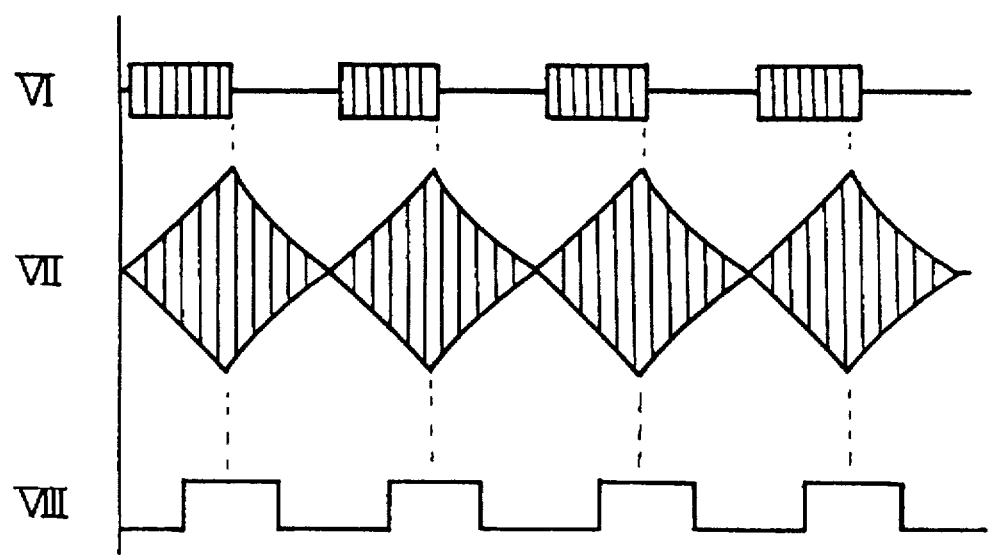
FIG. 18 is an illustration of waveforms of signals obtained at various portions of the circuit shown in FIG. 17.

FIG. 18 illustrates an example of the pen-pressure/time converting means 25. The pen-pressure time converting means 25 has a differentiating circuit composed of a capacitor 252 and a variable-resistance element 251 which varies its resistance in accordance with an operation which is expressed by a continuously variable parameter. In this case, the operation is a change in the pen pressure. More specifically, the resistance value of the element 251 increases as the pen pressure increases. FIG. 12 shows, by way of example, waveforms of signals appearing in the circuit shown in FIG. 11 in response to a continuous pulse signal IV input thereto from the continuous signal detecting circuit 24. The attenuation characteristic, i.e., attenuation time, of the output signal V varies in accordance with the change in the resistance value of the variable-resistance element 251. More specifically, the time required for attenuation becomes longer as the resistance value increases. The diode 253 is used for the purpose of preventing generation of a negative voltage at the time of fall of the pulse signal.

The variable-resistance element may be substituted by a capacitor which changes its capacitance in accordance with a change in the pen pressure or an inductance element which changes its inductance in accordance with a change in the pen pressure.

The counter 26 counts the number of waves of the voltage inducted in the resonance circuit 21 by the electric wave radiated from the position detecting device, within the period of the signal output from the pen-pressure/time converting means 25. The delay circuit 27 serves to delay the timing signal extracted by the timing extracting circuit 23, by a predetermined length of time. The P/S converting circuit 28 serves to supply the contents of the counter 26 to the resonance circuit 21 in synchronization with the timings of electric waves which are intermittently radiated from the position detecting device at a constant period, thereby changing the resonance characteristic of the resonance circuit 21.

The aforementioned receiving means 6 and the responding means 2 are constituted by the resonance circuit 21. The timing extracting circuit 23 serves as the timing extracting means 7 mentioned before. The converting means 4 is constituted by the continuous signal detecting circuit 24 and the pen-pressure/time converting means 25. The counter 26 functions as the counting means 5. The continuous signal detecting circuit 24, delay circuit 27 and the P/S converting circuit 28 in cooperation provide the control means 8 mentioned before.

The operation of the embodiment shown in FIG. 8 will be described with reference to FIG. 13 which shows waveforms of signals appearing at various portions of this embodiment. It is assumed here that the embodiment is used in combination with a position detecting device of the type which is disclosed in Japanese Patent Laid-Open No. 3-189716.

Figure 13:
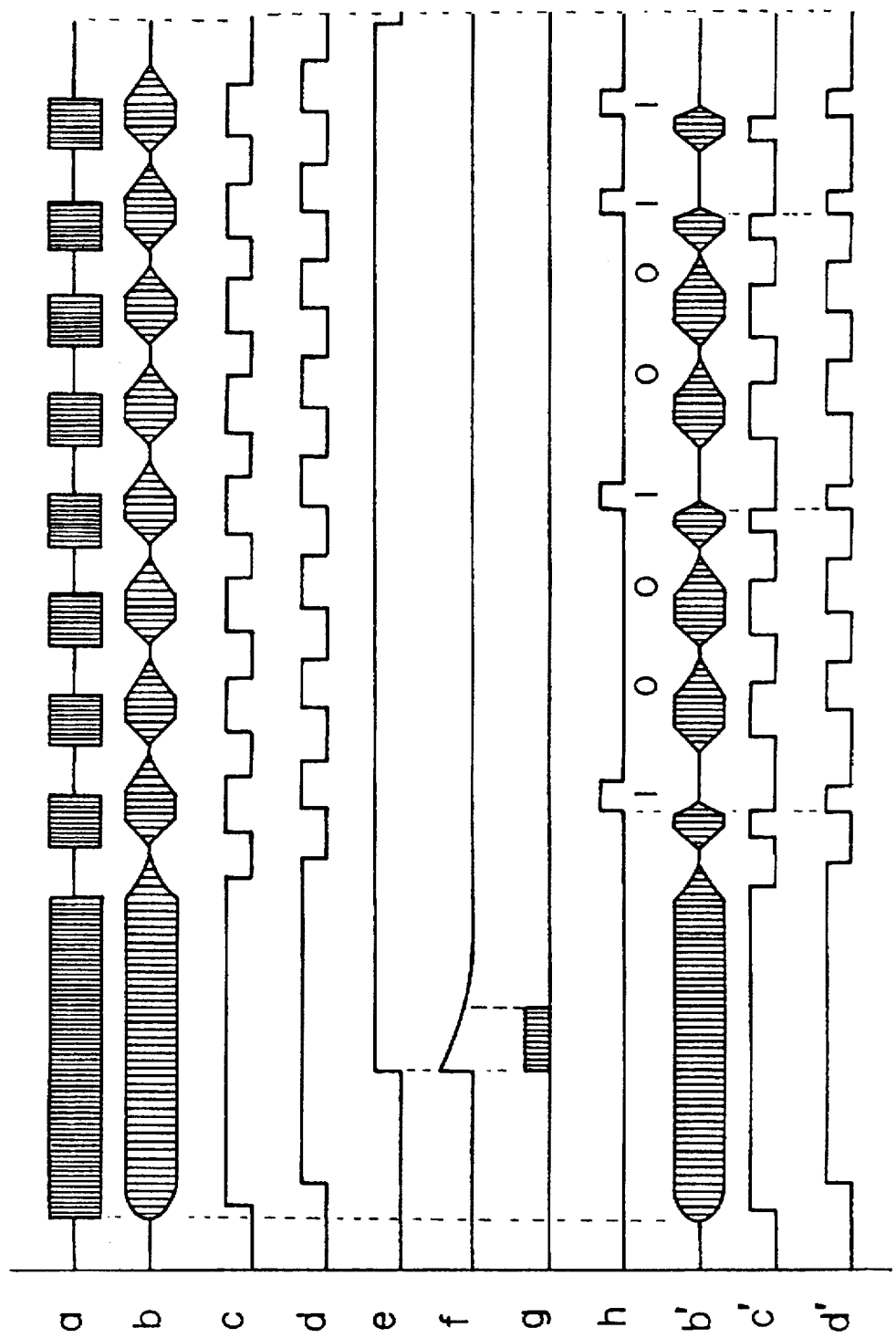
FIG. 13 is an illustration of waveforms of signals obtained at various portions of the embodiment shown in FIG. 8.

Referring to FIG. 13, the position detecting device radiates an electric wave signal of a predetermined frequency at timings shown by a waveform (a). In response to this electric wave signal, the resonance circuit 21 produces a signal (b) corresponding to the waveform (a). The voltage level of the signal (b) does not rise steeply in response to the receipt of the electric wave signal (a) not it drops sharply in response to the fall of the same, due to transient phenomenon peculiar to the resonance circuit 21.

The signal (b) is delivered to the power supply circuit 22 which extracts D.C. power from this signal. The extracted D.C. power is used in driving various circuits in the position pointing device. The signal (b) also is delivered to the counter 26 so as to be used as a clock signal. At the same time, the signal (b) is supplied to the timing extracting circuit 23 so as to become a signal (c) indicative of the timings of radiation of the electric wave from the position detecting device. The signal (c) indicative of the radiation timings is delivered to the delay circuit 27 so as to form a signal (d) which is delayed a predetermined time after the signal (c). The signal (c) also is delivered to the continuous signal detecting circuit 24 which forms, based on the signal (c), a signal (e) which lasts from a moment at which the signal (c) has been held for a time not shorter than a predetermined time till a moment which is lagged predetermined time behind the extinction of the series of intermittent pulse signal which follows the continuation of the signal (c). The signal (d) which is generated by delaying the signal (c) is intended to be used in a later-mentioned control of operation timing of the resonance circuit 21 such that the resonance circuit 21 is controlled in phase with the timing of suspension of radiation of the electric wave from the position detecting device, i.e., with the timing of receipt of the electric wave by the position detecting device.

The signal (e) is delivered to the pen-pressure/time converting means 25 so as to form a signal (f) of a duration which corresponds to the pen pressure. The signal (f) is input to the counter 26. The counter 26 counts the signal (b) throughout a certain period in which the level of the signal (f) is higher than a predetermined level, and produces a count value (g) which is expressed by a digital signal having a plurality of bits. The signal (g) shown in FIG. 13 is the signal which is in the least significant bit in the counter 26. The signal (g) is delivered to the P/S converting circuit 28 in a bit-parallel manner.

During the high-level period of the signal (e), the P/S converting circuit 28 delivers the digital signals of 8 bits received from the counter 26 to the resonance circuit 21 in synchronization with the rise of the eight pulses in the intermittent pulse signal (d). When the digital signal supplied to the resonance circuit 21 is "0", no change is caused in the resonance circuit 21, whereas, when the digital signal received by the resonance circuit 21 is "1", the resonance characteristic of the resonance circuit 21 is changed. For instance, the resonance circuit 21 is short-circuited so as to be set to a state in which it does not produce any signal.

The illustrated waveforms of the signals (b), (c) and (d) are obtained on conditions that the pen pressure is zero and that the content (g) of the counter 26 is zero, i.e., that the 8-bit digital signals are "00000000".

It is assumed here that a predetermined level of pen pressure is applied, so that an 8-bit digital signal "10010011" is delivered as the content (g) of the counter 26 to the P/S converting circuit 28. In this case, the P/S converting circuit 28 delivers to the resonance circuit a bit-serial signal (h) consisting of "1", "0", "0", "1", "0", "0", "1" and "1", in synchronization with the rise of the successive pulses in the aforementioned signal (d).

As stated before, the resonance circuit 21 in receipt of a digital signal "1" is short-circuited so as not to produce any signal. In this case, a signal (b') is obtained in place of the signal (b). Consequently, signals (c') and (d') are obtained in place of the aforesaid signals (c) and (d).

As will be clearly seen from the timings of the signal (a) and the signal (b'), at the timing at which the position detecting device is bound to receive the electric wave, there is a signal in the resonance circuit 21 when the latter is in receipt of the digital signal "0", whereas, when the same is in receipt of the digital signal "1", there is no signal in the resonance circuit 21, so that the position detecting device cannot receive any electric wave. Therefore, the position detecting device can acquire the content of the counter 26, i.e., information corresponding to the predetermined level of the pen pressure, based on whether or not any electric wave is received at the due timing.

It is conceivable that, depending on the values set on the elements of the pen-pressure/time converting means 25, the signal (f) may have a duration longer than a predetermined time length even when the pen pressure is zero, with the result that the content of the counter 26 fails to become "0". In such a case, the arrangement may be such that the P/S converting circuit 28 receives only the digital signals of bits which are on the more significant side of the bit at which "1" appears for the first time.

Figure 14:
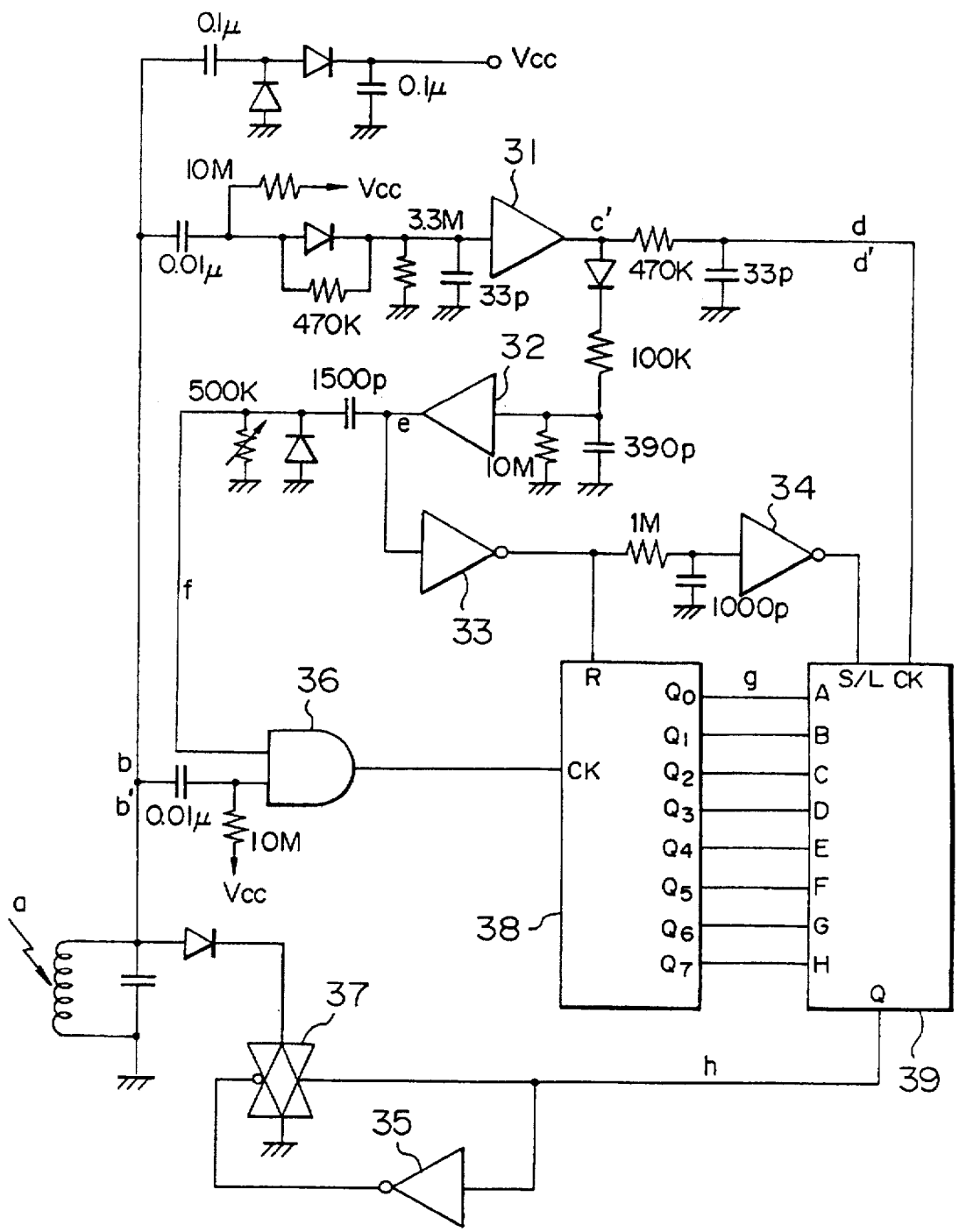
FIG. 14 is a circuit diagram showing a practical example of the circuit of the embodiment shown in FIG. 8.

FIG. 14 illustrates a practical example of the embodiment of the position pointing device of the invention shown in FIG. 8. In this Figure, numerals 31, 32 denote buffer amplifiers, 33, 34, 35 denote inverters, 36 denotes AND gate, 37 denotes an analog switch, 38 denotes a counter and 39 denotes a parallel/serial converting circuit. These circuits are realized in a C-MOS circuit having a high input impedance.

In the embodiment described hereinbefore, the electric waves are radiated eight times during the period of intermittent radiation from the position detecting device subsequent to the period of continuous radiation. This number of radiation cycles during the period of the intermittent radiation, however, is not exclusive, and may be suitably determined so as to be equal to the number of the bits which is sufficient to express the continuous amount such as the pen pressure. It is also possible to add the radiation cycles of a number corresponding to the number of bits necessary for expressing another kind of information, so that the information can be transmitted to the position detecting device in addition to the pen-pressure information.

Figure 15:
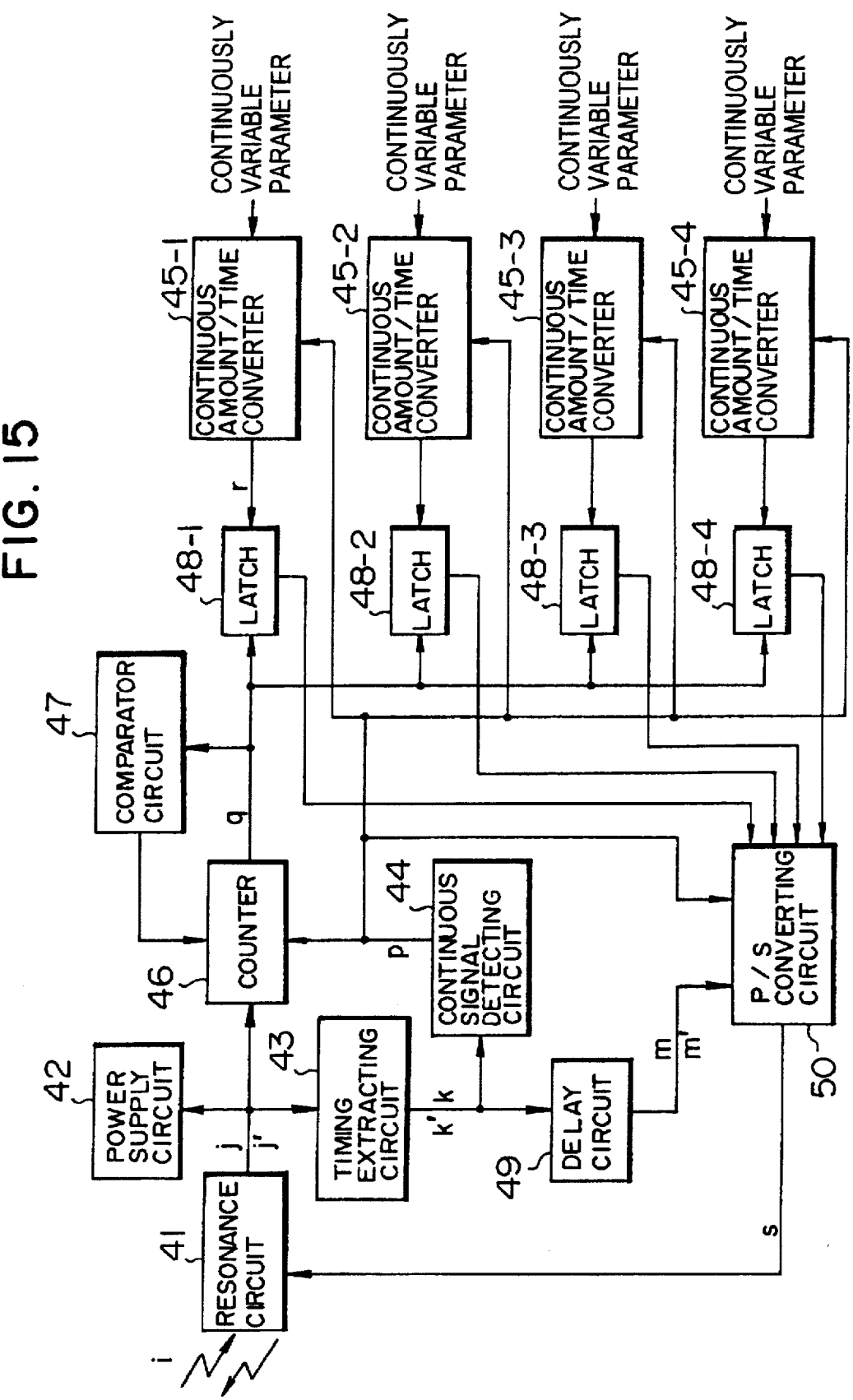
FIG. 15 is a block diagram illustrative of the construction of another embodiment of the position pointing device in accordance with the present invention.

FIG. 15 shows another embodiment of the position pointing device of the present invention, adapted to be used in combination with the basic form of the invention explained before in connection with FIG. 5, wherein the radiation of electric wave of a predetermined frequency from the position detecting device includes continuous radiation which lasts for a predetermined time or longer and a subsequent intermittent radiation which is conducted with a repetition period sufficiently shorter than the time length of the continuous radiation and which lasts over a predetermined duration. This position pointing device includes a resonance circuit 41, a power supply circuit 42, a timing extracting circuit 43, a continuous signal detecting circuit 44, continously-variable-parameter/time converting circuits 45-1, 45-2, 45-3 and 45-4, a counter 46, a comparator circuit 47, latches 48-1, 48-2, 48-3 and 48-4, a delay circuit 49, and a parallel/serial (P/S) converting circuit 50.

Figure 16:
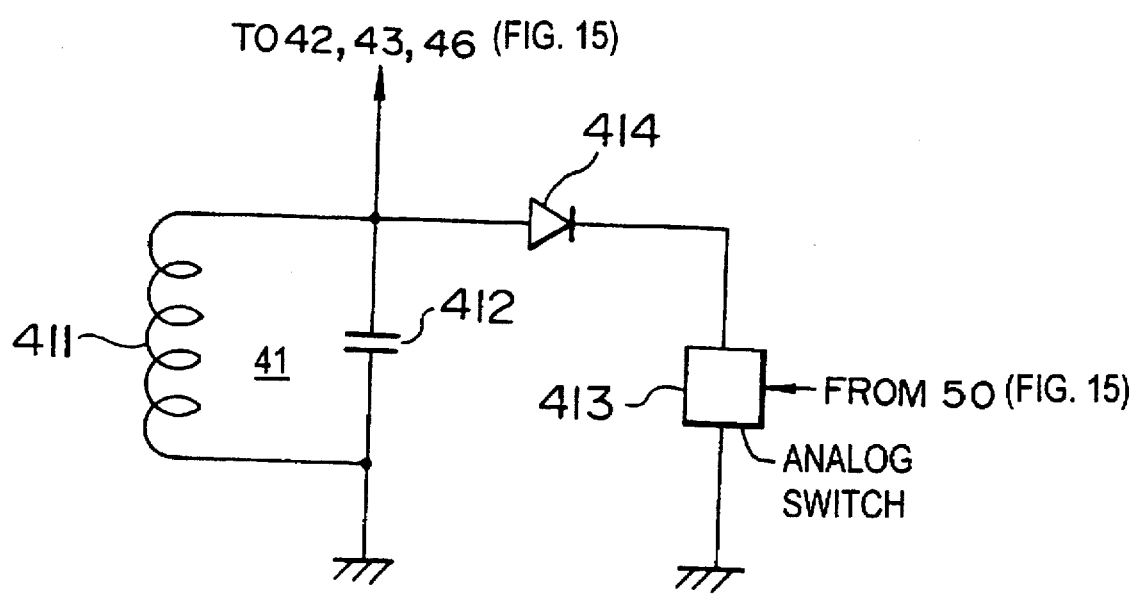
FIG. 16 is an illustration of an example of a resonance circuit incorporated in the embodiment shown in FIG. 15.

FIG. 16 illustrates an example of the resonance circuit 41. The resonance circuit 41 is constituted by an analog switch 413 and a resonator circuit composed of a coil 411 and a capacitor 412. The analog switch is controlled so as to be turned on and off in accordance with the signal from the P/S converting circuit 50. More specifically, the analog switch 413 is turned off and on, respectively, when the level of the signal from the P/S converting circuit 50 is low and high. When the analog switch 413 is turned on, the electrostatic charges stored in the capacitor 412 are discharged so as to set the signal voltage to zero. In this example, the signal voltage in the resonator circuit is controlled in accordance with the level of the signal) from the P/S converting circuit 50. This, however, is only illustrative and the arrangement may be such that the resonance frequency is controlled. A diode 414 is used for the purpose of preventing any negative voltage from being applied to the analog switch 413.

The power supply circuit 42 is of a known type constituted by a diode and a capacitor, and is adapted to form a D.C. voltage from the voltage induced in the resonance circuit 41 by the electric wave radiated from the position detecting device. The D.C. power thus obtained is used as the power for driving various circuits in the device.

Figure 17:
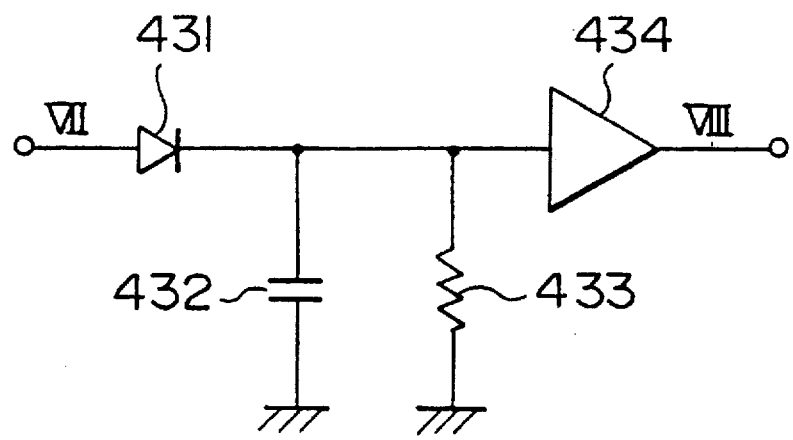
FIG. 17 is an illustration of an example of a timing extracting circuit incorporated in the embodiment shown in FIG. 15.

FIG. 17 shows an example of the timing extracting circuit 43. This timing extracting circuit includes a detecting circuit composed of a diode 431, capacitor 432 and a resistor 433, and a buffer amplifier 434. FIG. 18 is a waveform chart showing waveforms of signals appearing at various portions of the circuit shown in FIG. 17.

An alternating current signal VII is generated in the resonance circuit 41 in response to an electric wave signal VI intermittently radiated from the position detecting device. The alternating current signal VII is envelope-detected by the detecting circuit composed of the diode 431, capacitor 432 and the resistor 433, and is then shaped by the buffer amplifier 434 so as to become a pulse signal VIII.

Figure 19:
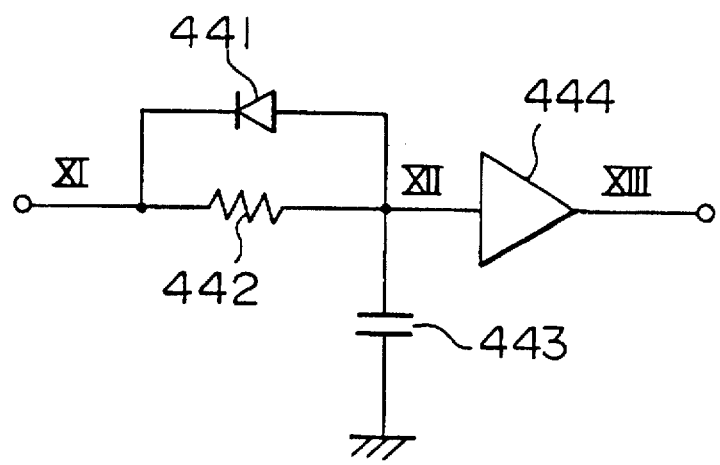
FIG. 19 is an illustration of an example of a continuous signal detecting circuit incorporated in the embodiment shown in FIG. 15.
Figure 20:
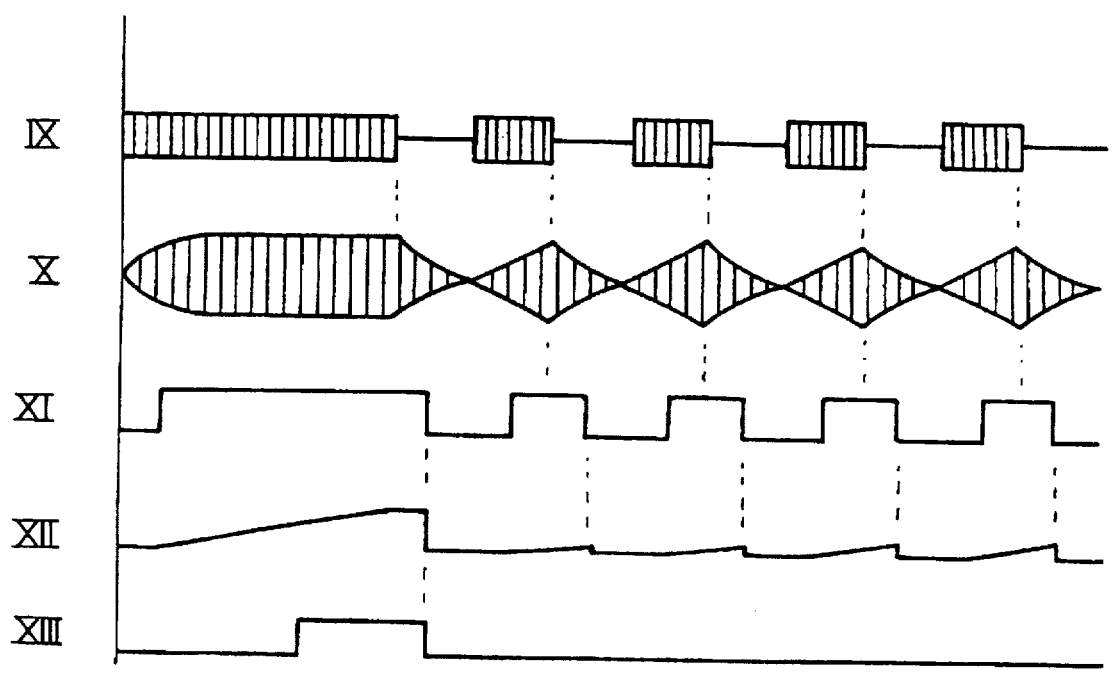
FIG. 20 is an illustration of waveforms of signals obtained at various portions of the circuit shown in FIG. 19.

FIG. 19 illustrates an example of the continuous signal detecting circuit 44. The continuous signal detecting circuit includes an integrating circuit composed of a diode 441, a resistor 442 and a capacitor 443, and a buffer amplifier 445. FIG. 20 is a waveform chart showing waveforms of signals obtained at various portions of the circuit shown in FIG. 19. Electric wave IX is radiated from the position detecting device. The radiation includes continuous radiation which is conducted for a predetermined length of time or longer and a subsequent intermittent radiation which is conducted with a repetition period sufficiently shorter than the time length of the continuous radiation and which has a predetermined duration. In response to the electric wave signal IX, the resonance circuit 41 generates an alternating current signal X which is then delivered to the timing extracting circuit 43, whereby an extracted pulse signal XI is formed. The pulse signal XI is then integrated by the integrating circuit composed of the diode 441, resistor 442 and the capacitor 443 so as to form a signal XII which is then shaped by the buffer amplifier 444 so as to become a signal XIII which contains only a continuous pulse.

Figure 21:
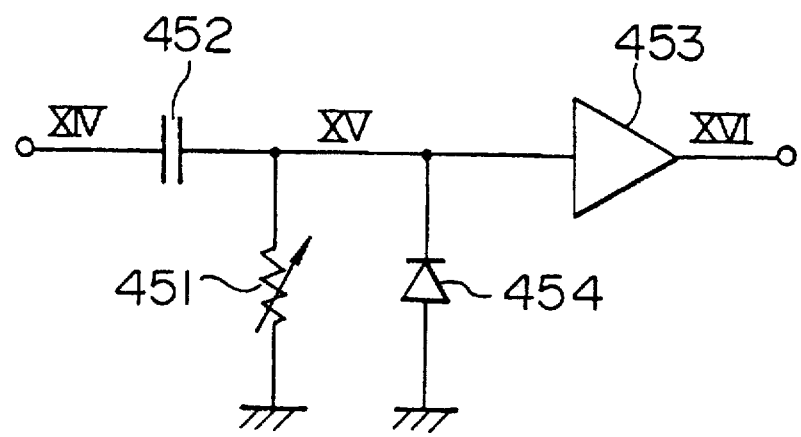
FIG. 21 is an illustration of the construction of a continuous amount/time converting circuit incorporated in the embodiment shown in FIG. 15.
Figure 22:
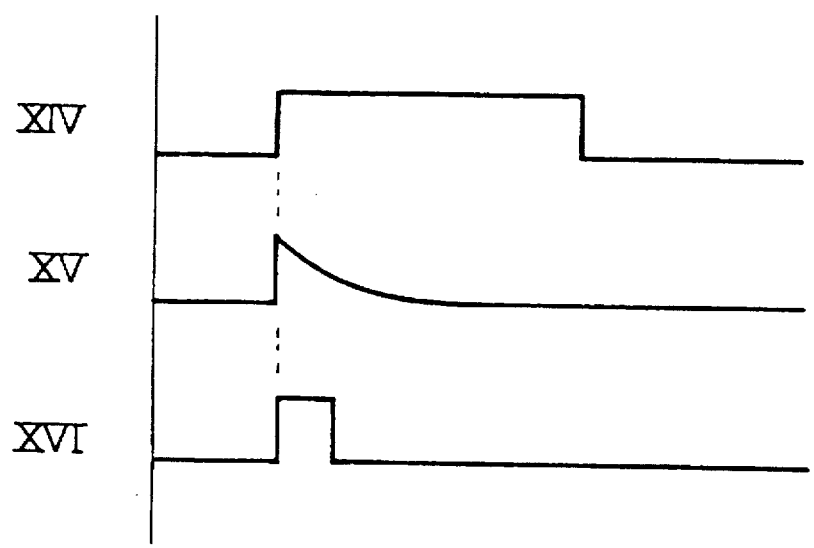
FIG. 22 is an illustration of waveforms of signals obtained at various portions of the circuit shown in FIG. 21.

FIG. 21 illustrates, by way of example, the construction of one of the continously-variable-parameter/time converting circuits 45-1 to 45-4. This circuit is constituted by a differentiation circuit composed of a capacitor 452 and a variable-resistance element whose resistance varies in accordance with an operation expressed by a continously variable parameter, and a buffer amplifier 453. FIG. 22 shows, by way of example, waveforms of signals at different portions of the circuit shown in FIG. 21. In this case, a continuous pulse signal XIV derived from the continuous signal detecting circuit 44 is input to the circuit shown in FIG. 21. The pulse signal XIV is differentiated by the variable-resistance element 451 and the capacitor 452 so as to become a signal XV which is then shaped by the buffer amplifier 453 so a to form an output signal XVI. The attenuation characteristic, i.e., attenuation time, of the signal XV varies according to the resistance value of the variable-resistance element 451. More specifically, the time required for attenuation becomes longer as the resistance value increases. Consequently, the duration or pulse width of the output signal XVI also varies in accordance with the resistance value of the variable-resistance element 451, i.e., in accordance with the operation expressed by the continously variable parameter. A diode 454 is used for the purpose of preventing generation of negative voltage when the pulse signal falls.

The counter 46 counts the number of waves or peaks of the voltage induced in the resonance circuit 41 by the electric are radiated from the position detecting device.

throughout a period between a moment at which the continuous signal detected by the continuous signal detecting circuit 44 is input and a moment at which a stop signal is input from the comparator circuit 47. The comparator circuit 47 compares the content of the counter 46 with the maximum value to be measured and produces the above-mentioned stop signal when the maximum value is reached.

Latches 48-1 to 48-n hold the contents of the counter 46 as obtained at moments of fall of the output signals from the respective continously-variable-parameter/time converting circuits 45-1 to 45-n. The delay circuit 49 effects a delay of the timing signal extracted from the timing extracting circuit 43 by a predetermined length of time. The P/S converting circuit 50 serves to serially deliver the counted values held by the latches 48-1 to 48-n to the resonance circuit 41 in synchronization with the timings of intermittent radiation of electric wave from the position detecting device, out of the timings extracted by the timing extracting circuit 43, thereby causing a change in the resonance characteristic of the resonance circuit 41.

The aforementioned receiving means 6 and the responding means 2 are constituted by the resonance circuit 41. The timing extracting circuit 23 serves as the timing extracting means 7 mentioned before. The converting means 4-1 to 4-n are constituted by the continuous signal detecting circuit 44 and the continuous-amount/time converting circuits 45-1 to 45-4. The counter 46 functions as the counting means 5. The continuous signal detecting circuit 44, delay circuit 49 and the P/S converting circuit 50 in cooperation provide the control means 10 mentioned before. The continuous signal detecting circuit 44 and the comparator circuit 47 in combination provide the counting control means 11. The aforementioned information holding means 12-1 to 12-4 are constituted by the latches 48-1 to 48-4.

The operation of the embodiment shown in FIG. 15 will be described with reference to FIG. 23 which shows waveforms of signals appearing at various portions of this embodiment. It is assumed here that the embodiment is used in combination with a position detecting device of the type which is disclosed in Japanese Patent Laid-Open No. 3-189716.

Figure 23:
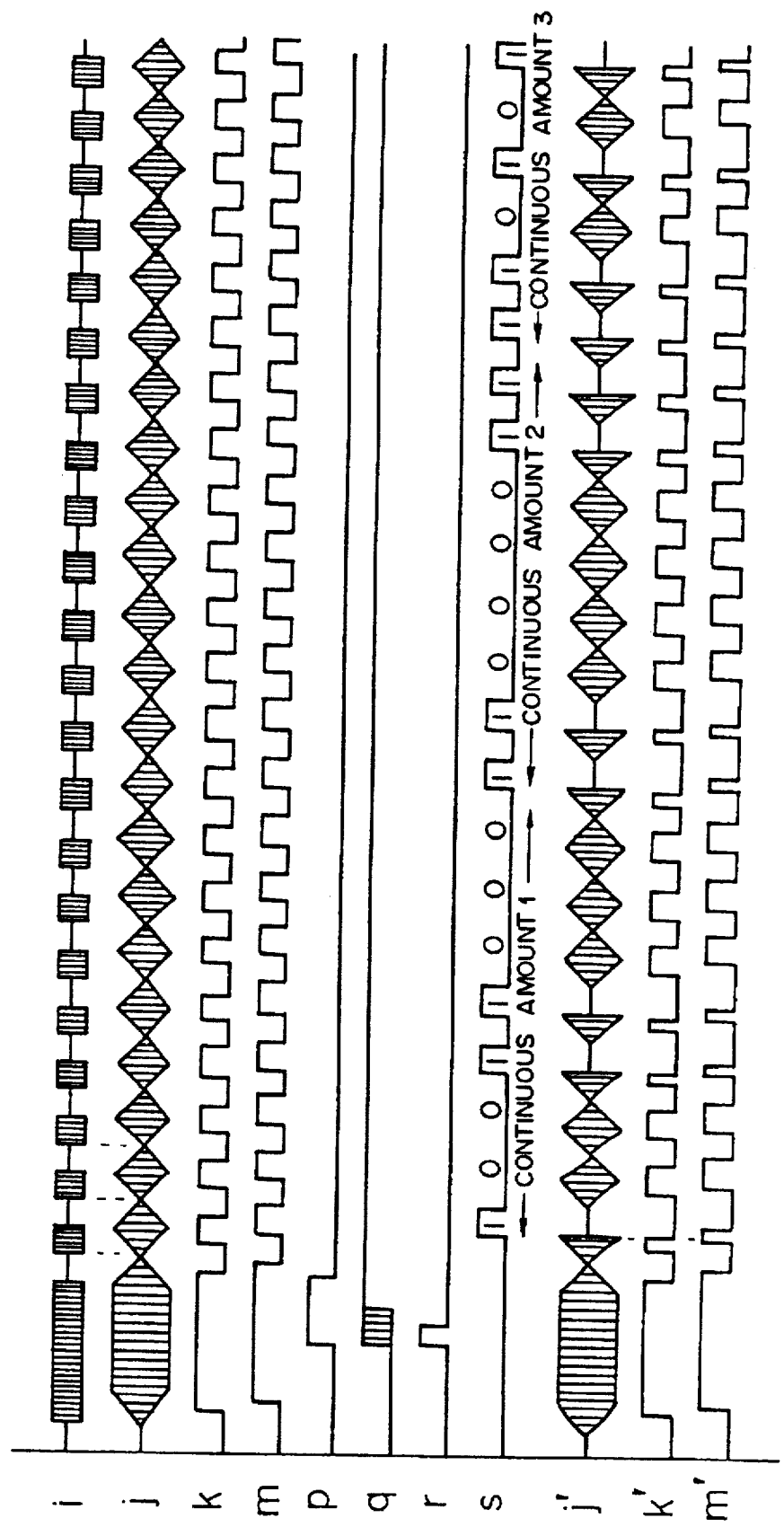
FIG. 23 is an illustration of waveforms of signals obtained at various portions of the embodiment shown in FIG. 15.

Referring to FIG. 23, the position detecting device radiates an electric wave signal of a predetermined frequency at timings shown by a waveform (i). In response to this electric wave signal, the resonance circuit 41 produces a signal (j) corresponding to the waveform (i). The voltage level of the signal (j) does not rise steeply in response to the receipt of the electric wave sinal (a) not it drops sharply in response to the fall of the same, due to transient phenomenon peculiar to the resonance circuit 41.

The signal (j) is delivered to the power supply circuit 42 which extracts D.C. power from this signal. The extracted D.C. power is used in driving various circuits in the position pointing device. The signal (j) also is delivered to the counter 46 so as to be used as a clock signal. At the same time, the signal (j) is supplied to the timing extracting circuit 43 so as to become a signal (k) indicative of the timings of radiation of the electric wave from the position detecting device. The signal (k) indicative of the radiation timings is delivered to the delay circuit 49 so as to form a signal (m) which is delayed a predetermined time after the signal (k). The signal (k) also is delivered to the continuous signal detecting circuit 44 which forms a signal (p) which takes high level only when the signal (k) is maintained continuously over a predetermined period. The signal (m) which is generated by delaying the signal (k) is intended to be used in a later-mentioned control of operation timing of the resonance circuit 41 such that the resonance circuit 41 is controlled in phase with the timing of suspension of radiation of the electric wave from the position detecting device, i.e., with the timing of receipt of the electric wave by the position detecting device.

The signal (p) is supplied to the counter 46 to initiate the counting by the counter 46. The signal (p) also is supplied to the continously-variable-parameter/time converting means 45-1 to 45-4. The counter 46 counts the signals (j) and produces a count value (q) which is expressed by a digital signal having a plurality of bits. The signal (q) shown in FIG. 23 is the signal which is in the least significant bit in the counter 46. The signal (q) is delivered to the comparator circuit 47 and also to the latches 48-1 to 48-n in a bit-parallel manner.

Based on the signal (p), the continously-variable-parameter/time converting means 45-1 to 45-4 respectively produce signals of durations or pulse widths corresponding to the continuous amounts 1 to 4, and delivers these signals to the latches 48-1 to 48-4, respectively. For instance, the continously variable-parameter/time converting circuit 45-1 produces a signal (r) and delivers it to the associated latch 48-1. The latches 48-1 to 48-4 temporarily hold the contents of the counter 46 as obtained at moments of fall of the signals from the continously variable-parameter/time converting means 45-1 to 45-4. The operation of the counter 46 is ceased when its content has reached the aforementioned maximum value, in response to a stop signal from the comparator circuit 47.

The P/S converting circuit 50 delivers the four digital signals each having a plurality of bits (8 bits in this case), held by the latches 48-1 to 48-4 to the resonance circuit 41 in synchronization with the rise of the pulses of the intermittent pulse signal (m). When the digital signal supplied to the resonance circuit 21 is "0", no change is caused in the resonance circuit 41, whereas, when the digital signal received by the resonance circuit 21 is "1", the resonance circuit 41 is switched by being short-circuited to a state in which it does not produce any signal.

The illustrated waveforms of the signals (j), (k) and (m) are obtained on conditions that the four continuous amounts 1 to 4 are all zero so the four counted values held by the latches 48-1 to 48-4 are all zero, i.e., that all the bits of the four 8-bit digital signals are zero.

It is assumed here that a predetermined continuously variable parameters 1 to 3 are applied so that 8-bit digital signals "10011000", "11000011" and "11010101" are held as the count values by the latches 48-1 to 48-3. Consequently, the P/S converting circuit 50 delivers to the resonance circuit 41 a serial signal "1", "0", "0", "1", "1", "0", "0", "0", "1", "1", "0", "0", "0", "0", "1", "1", "1", "1", "0", "1", "0", "1", "0", "1", in synchronization with the timings of rise of the pulses in the aforementioned signal (m).

As stated before, the resonance circuit 21 in receipt of a digital signal "1" is short-circuited so as not to produce any signal. In this case, a signal (j') is obtained in place of the signal (j). Consequently, signals (k') and (m') are obtained in place of the aforesaid signals (k) and (m).

As will be clearly seen from the timings of the signal (i) and the signal (j'), at the timing at which the position detecting device is bound to receive the electric wave, there is a signal in the resonance circuit 41 when the latter is in receipt of the digital signal "0", whereas, when the same is in receipt of the digital signal "1", there is no signal in the resonance circuit 41, so that the position detecting device cannot receive any electric wave. Therefore, the position detecting device can acquire the four counted values held by the latches 48-1 to 48-4, i.e., four kinds of information corresponding to continously variable parameters 1 to 4, based on whether or not any electric wave is received at the due timing.

It is conceivable that, depending on the values set on the elements of the of each of the continously-variable-parameter/time converting means 45-1 to 45-n, the output signal from such means may have a duration longer than a predetermined time length even when the associated continously variable parameter is zero, with the result that the count value held by each latch fails to become "0". To overcome this problem, the arrangement may be such that the P/S converting circuit 50 receives only the digital signals of bits which are on the more significant side of the bit at which "1" appears for the first time.

In the embodiment described in connection with FIG. 15, the electric waves are radiated 32 times, i.e., 8 times for each of the four counted values, during the period of intermittent radiation from the position detecting device subsequent to the period of continuous radiation. This number of radiation cycles during the period of the intermittent radiation, however, is not exclusive, and may be suitably determined so as to be equal to the number of the bits which is sufficient to express the number of the continously variable parameters and the values of these continously variable parameters. It is also possible to increase the number of radiation cycles in the intermittent radiation by a number corresponding to the number of bits necessary for expressing any other kind of information, so that such information can be transmitted to the position detecting device in addition to the above-mentioned four kinds of information.

The position detecting device may be of the type which is capable of detecting the state of coupling between itself and the position pointing device. The detection of the state of coupling can be done immediately before the termination of the intermittent radiation of the electric wave from the position detecting device.

As will be understood from the foregoing description, the present invention offers various advantages as follows.

In one aspect, the invention provides a position pointing device, comprising: receiving means for receiving alternating electric, magnetic or electromagnetic field of a predetermined frequency radiated from a position detecting device; responding means for sending alternating electric, magnetic or electromagnetic field of a desired frequency back to the position detecting device; control means for controlling the responding means in accordance with a binary code indicative of information corresponding to an operation which is expressed by a continously variable parameter, so as to cause a change in the alternating electric, magnetic or electromagnetic field to be sent back to the position detecting device; converting means for converting the information corresponding to the operation into a time length; and counting means for counting the number of waves of the alternating electric, magnetic or electromagnetic field of the predetermined frequency received within the time length determined by the converting means and for binary-coding the counted value.

According to this arrangement, the information corresponding to the operation expressed by a continously variable parameter can be coded without requiring A/D converter and clock oscillator which consume large electric power, thus realizing a position pointing device operable with reduced electric power. Consequently, requirement for replacement or recharging of any internal battery is reduced or the position pointing device can be realized without using any battery at all.

In another form of the present invention, there is provided a position pointing device, comprising: receiving means for receiving alternating electric, magnetic or electromagnetic field of a predetermined frequency radiated at predetermined timings from a position detecting device; responding means for sending alternating electric, magnetic or electromagnetic field of a desired frequency back to the position detecting device; timing extracting means for extracting the predetermined timings from the received alternating electric, magnetic or electromagnetic field; control means for controlling, at preselected timings based on the predetermined timings, the responding means in accordance with a binary code indicative of information corresponding to an operation which is expressed by a continously variable parameter, so as to cause a change in the alternating electric, magnetic or electromagnetic field to be sent back to the position detecting device; converting means for converting the information corresponding to the operation into a time length; and counting means for counting the number of waves of the alternating electric, magnetic or electromagnetic field of the predetermined frequency received within the time length determined by the converting means and for binary-coding the counted value.

According to this arrangement, it is possible to obtain a high efficiency of transmission to the position detecting device of the information corresponding to the operation expressed by the continously variable parameter.

In still another form, the present invention provides a position pointing device, comprising: receiving means for receiving alternating electric, magnetic or electromagnetic field of a predetermined frequency radiated from a position detecting device; responding means for sending alternating electric, magnetic or electromagnetic field of a desired frequency back to the position detecting device; control means for controlling the responding means in accordance with a binary code indicative of information corresponding to an operation which is expressed by a continously variable parameter, so as to cause a change in the alternating electric, magnetic or electromagnetic field to be sent back to the position detecting device; a plurality of converting means for converting a plurality of kinds of information corresponding to a plurality of types of operation expressed by continously variable parameter into time lengths; and a plurality of counting means for counting the numbers of waves of the alternating electric, magnetic or electromagnetic field of the predetermined frequency received within the respective time lengths determined by the converting means and for binary-coding the counted values.

According to this arrangement, it is possible to transmit to the position detecting device a plurality of kinds of information corresponding to a plurality of types of operation expressed by continously variable parameters.

In a different form of the invention, a position pointing device is provided which comprises: a position pointing device, comprising: receiving means for receiving alternating electric, magnetic or electromagnetic field of a predetermined frequency radiated at predetermined timings from a position detecting device; responding means for sending alternating electric, magnetic or electromagnetic field of a desired frequency back to the position detecting device; timing extracting means for extracting the predetermined timings from the received alternating electric, magnetic or electromagnetic field; control means for controlling, at preselected timings based on the predetermined timings, the responding means in accordance with a binary code indicative of information corresponding to an operation which is expressed by a continously variable parameter, so as to cause a change in the alternating electric, magnetic or electromagnetic field to be sent back to the position detecting device; a plurality of converting means for converting a plurality of kinds of information corresponding to a plurality of types of operation expressed by continously variable parameters into time lengths; and a plurality of counting means for counting the numbers of waves of the alternating electric, magnetic or electromagnetic field of the predetermined frequency received within the respective time lengths determined by the converting means and for binary-coding the counted values.

With this arrangement, it is possible to efficiently transmit to the position detecting device a plurality of kinds of information corresponding to a plurality of type of operation expressed by continously variable parameters.

In a different form of the invention, a position pointing device is provided which comprises: receiving means for receiving alternating electric, magnetic or electromagnetic field of a predetermined frequency radiated at predetermined timings from a position detecting device; responding means for sending alternating electric, magnetic or electromagnetic field of a desired frequency back to the position detecting device; timing extracting means for extracting the predetermined timings from the received alternating electric, magnetic or electromagnetic field; control means for controlling, at preselected timings based on the predetermined timings, the responding means in accordance with a binary code indicative of information corresponding to an operation which is expressed by a continously variable parameters, so as to cause a change in the alternating electric, magnetic or electromagnetic field to be sent back to the position detecting device; a plurality of converting means for converting a plurality of kinds of information corresponding to a plurality of types of operation expressed by continously variable parameters into time lengths; counting means for counting the numbers of waves of the received alternating electric, magnetic or electromagnetic field of the predetermined frequency and for binary coding the counted value; counting control means for initiating the operation of the plurality of converting means at a preselected timing based on the predetermined timings while initiating the operation of the counting means at the preselected timing or a timing synchronized therewith; and information holding means for holding the counted values as obtained in the counting means at moments at which the time lengths determined by the converting means expire.

According to this arrangement, it is possible to determine binary codes representative of a plurality of kinds of information corresponding to a plurality of types of operation expressed by continously variable parameters, by using only one counting means, thus contributing to reduction in the electrical power consumption.

In a different form of the invention, there is provided a position pointing device, comprising: receiving means for receiving alternating electric, magnetic or electromagnetic field of a predetermined frequency radiated at predetermined timings from a position detecting device; responding means for sending alternating electric, magnetic or electromagnetic field of a desired frequency back to the position detecting device; timing extracting means for extracting the predetermined timings from the received alternating electric, magnetic or electromagnetic field; control means for controlling, at preselected timings based on the predetermined timings, the responding means in accordance with a binary code indicative of information corresponding to an operation which is expressed by a continously variable parameter, so as to cause a change in the alternating electric, magnetic or electromagnetic field to be sent back to the position detecting device; a plurality of converting means for converting a plurality of kinds of information corresponding to a plurality of types of operation expressed by continously variable parameters into time lengths; counting means for counting the numbers of waves of the received alternating electric, magnetic or electromagnetic field of the predetermined frequency and for binary coding the counted value; counting control means for successively initiating the operations of the plurality of converting means one after another at a series of timings of a predetermined time interval starting with a preselected timing based on the predetermined timings, while repeatedly initiating the operation of the counting means at the series of timings or at timings synchronized therewith; and information holding means for holding the counted values as obtained in the counting means at moments at which the time lengths determined by the converting means expire.

This arrangement enables the plurality of converting means to operate at different timings in converting the plurality of kinds of information corresponding to the plurality of types of operation expressed by continously variable parameters into respective time lengths, thus reducing the instantaneous power consumption.

When the arrangement is such that the operation of the counting means is ceased when the value counted by the counting means has reached a predetermined maximum value to be measured, it is possible to shorten the time length of operation of the counting means, thus reducing the electrical power consumption.

In a different form of the invention, a position pointing device comprises: receiving means for receiving alternating electric, magnetic or electromagnetic field of a predetermined frequency radiated at predetermined timings from a position detecting device; responding means for sending alternating electric, magnetic or electromagnetic field of a desired frequency back to the position detecting device; timing extracting means for extracting the predetermined timings from the received alternating electric, magnetic or electromagnetic field; control means for controlling, at preselected timings based on the predetermined timings, the responding means in accordance with a binary code indicative of information corresponding to an operation which is expressed by a continously variable parameter, so as to cause a change in the alternating electric, magnetic or electromagnetic field to be sent back to the position detecting device; a plurality of converting means for converting a plurality of kinds of information corresponding to a plurality of types of operation expressed by continously variable parameters into time lengths; counting means for counting the numbers of waves of the received alternating electric, magnetic or electromagnetic field of the predetermined frequency and for binary coding the counted value; counting control means for initiating the operation of one of the plurality of converting means and then initiating the operation of the next one of the plurality of converting means at a timing at which the time length determined by the one of the plurality of converting means expires or at a timing synchronized therewith, thus sequentially initiating operations of the remainder converting means one after another, while repeatedly initiating the operation of the counting means at the timings of initiation of the successive converting means or at timings synchronized therewith; and information holding means for holding the counted values as obtained in the counting means at moments at which the time lengths determined by the converting means expire.

This arrangement enables the plurality of converting means to operate at different timings in converting the plurality of kinds of information corresponding to the plurality of types of operation expressed by continously variable parameters into respective time lengths, thus reducing the instantaneous power consumption. In addition, it is possible to shorten the time length of operation of the counting means. It is therefore possible to reduce both instantaneous power consumption and total power consumption.

If the arrangement is such that the operation of the counting means is ceased at a timing at which the time length determined by the converting means which is operated last expires or at a timing synchronized therewith, it is possible to minimize the operation time of the counting means, further contributing to reduction in the electrical power consumption.

In one specific form of the position pointing device of the invention, the alternating electric, magnetic or electromagnetic field of the predetermined frequency is intermittently radiated from the position detecting device over a predetermined duration at a predetermined period of repetition, and the responding means is controlled in synchronization with the suspension of radiation during the intermittent radiation of the alternating electric, magnetic or electromagnetic field.

According to this arrangement, it is possible to obtain a clear time sharing or distinction between the radiation of the alternating electric, magnetic or electromagnetic field from the position detecting device and the sending of the alternating electric, magnetic or electromagnetic field back to the position detecting device, thus realizing high degrees of reliability and efficiency of transmission of information corresponding to operation expressed by a continously variable parameter to the position detecting device.

In another specific form of the present invention, the radiation of the alternating electric, magnetic or electromagnetic field of the predetermined frequency from the position pointing device includes a continuous radiation conducted for a predetermined length of time or longer and a subsequent intermittent radiation conducted over a predetermined duration with a repetition period sufficiently shorter than the time length of the continuous radiation, and the responding means is controlled in synchronization with the suspension of radiation which occurs after the continuous radiation conducted for the predetermined length of time or longer.

According to this arrangement, it is possible to obtain a clear distinction between the timing of detection of the coordinate values of the pointed position on the position detecting device and the timing of transmission of the information corresponding to the operation expressed by a continously variable parameter, thus realizing high degrees of reliability and efficiency of transmission of information corresponding to operation expressed by a continously variable parameter to the position detecting device.

In another specific form of the invention, the radiation of the alternating electric, magnetic or electromagnetic field of the predetermined frequency from the position pointing device includes a continuous radiation conducted for a predetermined length of time or longer and a subsequent intermittent radiation conducted over a predetermined duration with a repetition period sufficiently shorter than the time length of the continuous radiation, and the timing of radiation of the alternating electric, magnetic or electromagnetic field from the position detecting device conducted for the predetermined length of time or longer is used as the aforementioned preselected timing.

According to this arrangement, it is possible to stably operate a plurality of converting means and counting means.

In a specific form of the invention in which the converting means comprises an element which continuously changes its characteristic in accordance with the operation expressed by a continously variable parameter, the converting means can be realized with a simple construction.

In a still another specific form of the invention, the converting means comprises a time constant circuit including an element which continuously changes its resistance, inductance or capacitance in accordance with the operation expressed by a continously variable parameter.

This arrangement provides converting means which is simple in construction and which can operate with reduced power consumption.

In still another specific form of the invention, both the receiving means and the responding means make use of a resonance circuit.

According to this arrangement, it is possible to realize high efficiency of receipt of the alternating electric, magnetic or electromagnetic field from the position detecting device, as well as high efficiency of sending of the alternating electric, magnetic or electromagnetic field back to the position detecting device.

When the resonance circuit is used, the control means may be arranged to control the resonance characteristic of the resonance circuit.

With this arrangement, it is possible to easily vary the alternating electric, magnetic or electromagnetic field which is set back to the position detecting device.

In still another specific form of the invention, the position pointing device incorporates power extracting means for extracting electric energy for driving circuits in the device, from the alternating electric, magnetic or electromagnetic field of the predetermined frequency received by the resonance circuit.

Such power extracting means eliminates the necessity for specific power supply means such as batteries.

What is claimed is:

1. A position pointing device, comprising:
a receiver for receiving an AC field of a predetermined frequency radiated from a position detecting device;
an emitter for sending an AC field of a desired frequency back to said position detecting device;
a controller for controlling said emitter in accordance with a binary code indicative of information corresponding to an operation which is expressed by a continuously variable parameter, so as to cause a change in said AC field to be sent back to said position detecting device;
a converter for converting said information corresponding to said operation into a time length; and
a counter for counting the number of waves of said AC field of the predetermined frequency received within the time length determined by said converter and for binary-coding the counted value.

2. A position pointing device, comprising:
a receiver for receiving an AC field of a predetermined frequency radiated at predetermined intervals from a position detecting device;
an emitter for sending an AC field of a desired frequency back to said position detecting device;
a timing extractor for extracting said predetermined intervals from the received AC field;
a controller for controlling, at preselected intervals based on said predetermined intervals, said emitter in accordance with a binary code indicative of information corresponding to an operation which is expressed by a continuously variable parameter, so as to cause a change in said AC field which is to be sent back to said position detecting device;
a converter for converting said information corresponding to said operation into a time length; and
a counter for counting the number of waves of said AC field of the predetermined frequency received within the time length determined by said converter and for binary-coding the counted value.

3. A position pointing device, comprising:
a receiver for receiving an AC field of a predetermined frequency radiated from a position pointing device;
an emitter for sending an AC field of a desired frequency back to said position detecting device;
a controller for controlling said emitter in accordance with a binary code indicative of information corresponding to an operation which is expressed by a continuously variable parameter, so as to cause a change in said AC field to be sent back to said position detecting device;
plural converters for converting a plurality of kinds of information corresponding to a plurality of types of operation expressed by continuously variable parameters into time lengths; and
plural counters for counting the number of waves of said AC field of the predetermined frequency received within the respective time lengths determined by said converters and for binary-coding the counted values.

4. A position pointing device, comprising:
a receiver for receiving an AC field of a predetermined frequency radiated at predetermined intervals from a position detecting device;
an emitter for sending an AC field of a desired frequency back to said position detecting device;
a timing extractor for extracting said predetermined intervals from the received AC field;
a controller for controlling, at preselected intervals based on said predetermined intervals, said emitter in accordance with a binary code indicative of information corresponding to an operation which is expressed by a continuously variable parameter, so as to cause a change in said AC field to be sent back to said position detecting device;
plural converters for converting a plurality of kinds of information corresponding to a plurality of types of operation expressed by continuously variable parameters into time lengths; and
plural counters for counting the number of waves of said AC field of the predetermined frequency received within the respective time lengths determined by said converting means and for binary-coding the counted values.

5. A position pointing device, comprising:
a receiver for receiving an AC field of a predetermined frequency radiated at predetermined intervals from a position detecting device;
an emitter for sending an AC field of a desired frequency back to said position detecting device;
a timing extractor for extracting said predetermined intervals from the received AC field;
a controller for controlling, at preselected intervals based on said predetermined intervals, said emitter in accordance with a binary code indicative of information corresponding to an operation which is expressed by a continuously variable parameter, so as to cause a change in said AC field to be sent back to said position detecting device;

plural converters for converting a plurality of kinds of information corresponding to a plurality of types of operation expressed by continuously variable parameters into time lengths;

a counter for counting the number of waves of the received AC field of the predetermined frequency and for binary coding the counted value;

a counter controller for initiating operation of said plural converters at a preselected timing based on said predetermined intervals while initiating the operation of said counter at said preselected intervals or intervals synchronized therewith; and a memory for holding the counted values as obtained by said counter at moments at which the time lengths determined by said converters expire.

6. A position pointing device, comprising:

a receiver for receiving an AC field of a predetermined frequency radiated at predetermined intervals from a position detecting device;

an emitter for sending an AC field of a desired frequency back to said position detecting device;

a timing extractor for extracting said predetermined intervals from the received AC field;

a controller for controlling, at preselected intervals based on said predetermined intervals, said emitter in accordance with a binary code indicative of information corresponding to an operation which is expressed by a continuously variable parameter, so as to cause a change in said AC field to be sent back to said position detecting device;

plural converters for converting a plurality of kinds of information corresponding to plural types of operation expressed by continuously variable parameters into time lengths;

a counter for counting the number of waves of the received AC field of the predetermined frequency and for binary coding the counted value;

a counter controller for successively initiating the operations of said plural converters one after another at a series of intervals of a predetermined time interval starting with a preselected interval based on said predetermined intervals, while repeatedly initiating the operation of said counter at said series of intervals or at intervals synchronized therewith; and a memory for holding the counted values as obtained by said counter at moments at which the time lengths determined by said converter expire.

7. A position pointing device according to claim 5, wherein the operation of said counter is ceased when the value counted by said counter has reached a predetermined maximum value to be measured.

8. A position pointing device, comprising:

a receiver for receiving an AC field of a predetermined frequency radiated at predetermined intervals from a position detecting device;

an emitter for sending an AC field of a desired frequency back to said position detecting device;

a timing extractor for extracting said predetermined intervals from the received AC field;

a controller for controlling, at preselected intervals based on said predetermined intervals, said emitter in accordance with a binary code indicative of information corresponding to an operation which is expressed by a continuously variable parameter, so as to cause a change in the AC field to be sent back to said position detecting device;

plural converters for converting plural types of information corresponding to plural types of operation expressed by continuously variable parameters into time lengths;

a counter for counting the number of waves of the received AC field of the predetermined frequency and for binary coding the counted value;

a counting controller for initiating the operation of one of said plural converters and then initiating the operation of the next one of said plural converters at a interval at which the time length determined by said one of said plural converters expires or at a timing synchronized therewith, thus sequentially initiating operations of the remainder of converters one after another, while repeatedly initiating the operation of said counter at the intervals of initiation of the successive converters or at intervals synchronized therewith; and a memory for holding the counted values as obtained in said counter at moments at which the time lengths determined by said converters expire.

9. A position pointing device according to claim 6, wherein the operation of said counter is ceased when the time length determined by the converter is operated last expires or at a time synchronized therewith.

10. A position pointing device according to claim 2, wherein said AC field of the predetermined frequency is intermittently radiated from said position detecting device over a predetermined duration at a predetermined period of repetition, and said emitter is controlled in synchronization with the suspension of radiating during the intermittent radiation of said AC field.

11. A position pointing device according to claim 2, wherein the radiation of said AC field of the predetermined frequency from said position pointing device includes a continuous AC field emitted for a predetermined length of time or longer and a subsequent intermittent radiation emitted over a predetermined duration with a repetition period sufficiently shorter than the time length of the continuous radiation, and said emitter is controlled in synchronization with the suspension of the AC field which occurs after the continuous AC field is emitted for the predetermined length of time or longer.

12. A position pointing device according to claim 5, wherein the field of said AC field of the predetermined frequency emitted from said position pointing device includes a continuous field emitted for a predetermined length of time or longer and a subsequent intermittent field emitted over a predetermined duration with a repetition period sufficiently shorter than the time length of the continuous field, and wherein the duration of radiation of said AC field from said position detecting device emitted for said predetermined length of time or longer is used as said preselected interval.

13. A position pointing device according to claim 1, wherein said converter comprises an element which continuously changes its characteristic in accordance with the operation expressed by the continuously variable parameter.

14. A position pointing device according to claim 1, wherein said converter comprises a time constant circuit including an impedance which continuously changes in value in accordance with the operation expressed by the continuously variable parameter.

15. A position pointing device according to claim 1, wherein said receiver and said emitter comprise a resonance circuit.

16. A position pointing device according to claim 15, wherein said controller controls the resonance characteristic of said resonance circuit.

17. A position pointing device according to claim 15, further comprising a power extractor for extracting electric energy for driving circuits in said device, from said AC field of the predetermined frequency received by said resonance circuit.

* * * * *